US010003746B2

(12) United States Patent
Minamisawa

(10) Patent No.: US 10,003,746 B2
(45) Date of Patent: Jun. 19, 2018

(54) OPTICAL UNIT WITH SHAKE CORRECTION FUNCTION

(71) Applicant: NIDEC SANKYO CORPORATION, Suwa-gun, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 99 days.

(21) Appl. No.: 15/023,878

(22) PCT Filed: Sep. 5, 2014

(86) PCT No.: PCT/JP2014/073435
§ 371 (c)(1),
(2) Date: Mar. 22, 2016

(87) PCT Pub. No.: WO2015/045792
PCT Pub. Date: Apr. 2, 2015

(65) Prior Publication Data
US 2016/0241786 A1    Aug. 18, 2016

(30) Foreign Application Priority Data

Sep. 25, 2013   (JP) ................................ 2013-198908

(51) Int. Cl.
*H04N 5/228*      (2006.01)
*H04N 5/232*      (2006.01)
(Continued)

(52) U.S. Cl.
CPC ......... *H04N 5/23287* (2013.01); *G02B 7/023* (2013.01); *G02B 27/644* (2013.01);
(Continued)

(58) Field of Classification Search
CPC .................... G03B 2205/0007; H04N 5/23287
See application file for complete search history.

(56) References Cited

U.S. PATENT DOCUMENTS

2011/0103782 A1* 5/2011 Tsuruta ................. G02B 7/022
396/55

FOREIGN PATENT DOCUMENTS

JP        02287423 A      11/1990
JP        09018776 A       1/1997
(Continued)

OTHER PUBLICATIONS

International Search Report corresponding to Application No. PCT/JP2014/073435; dated Dec. 16, 2014, with English translation.

*Primary Examiner* — Gary C Vieaux
(74) *Attorney, Agent, or Firm* — Cantor Colburn LLP

(57) ABSTRACT

An optical unit with a shake correction function may include a movable module holding an optical element; a fixed body; a support mechanism swingably supporting the movable module at a midway position in an optical axis direction; and a shake correction drive mechanism to swing the movable module. The movable module may include an optical module which holds the optical element; and a weight provided on one side of a front side and a rear side in the optical axis direction of the optical module, the weight being configured to shift a gravity center position of the movable module to a support position side of the support mechanism relative to a gravity center position of the optical module in the optical axis direction. An end face of one side of the weight may be formed in a flat face which is perpendicular to the optical axis direction.

15 Claims, 11 Drawing Sheets

(51) Int. Cl.
*G03B 5/00* (2006.01)
*H04N 5/225* (2006.01)
*G02B 7/02* (2006.01)
*G02B 27/64* (2006.01)

(52) U.S. Cl.
CPC ............ *G03B 5/00* (2013.01); *H04N 5/2257* (2013.01); *G03B 2205/0007* (2013.01)

(56) References Cited

FOREIGN PATENT DOCUMENTS

| | | | |
|---|---|---|---|
| JP | 2005156989 A | 6/2005 |
| JP | 2007286169 A | 11/2007 |
| JP | 2010096805 A | 4/2010 |
| JP | 2010096863 A | 4/2010 |
| JP | 2010117708 A | 5/2010 |
| WO | 2010010712 A1 | 1/2010 |

* cited by examiner

Fig. 7(A)
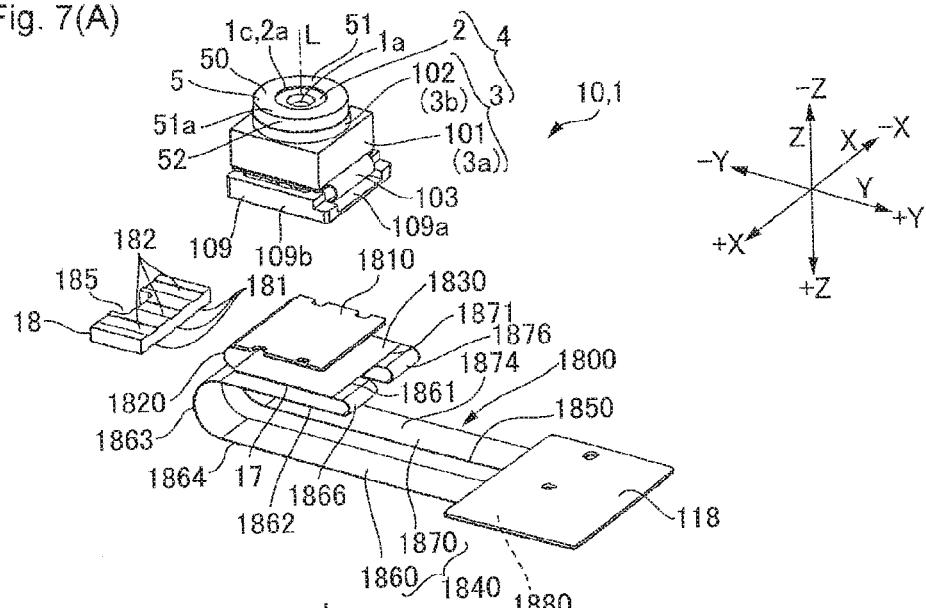
Fig. 7(B)
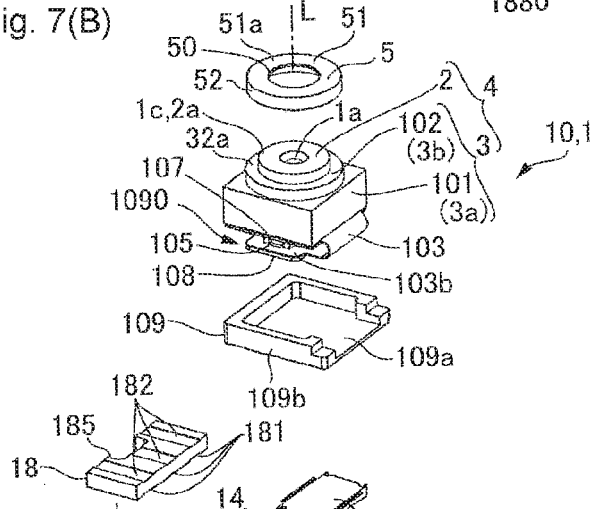
Fig. 7(C)
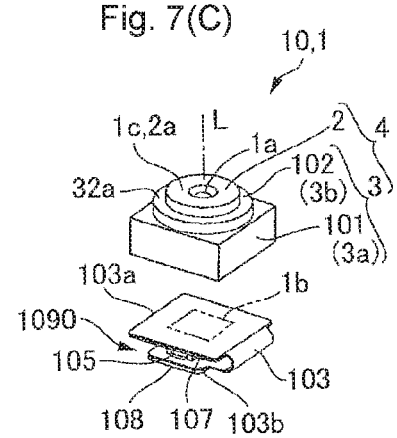
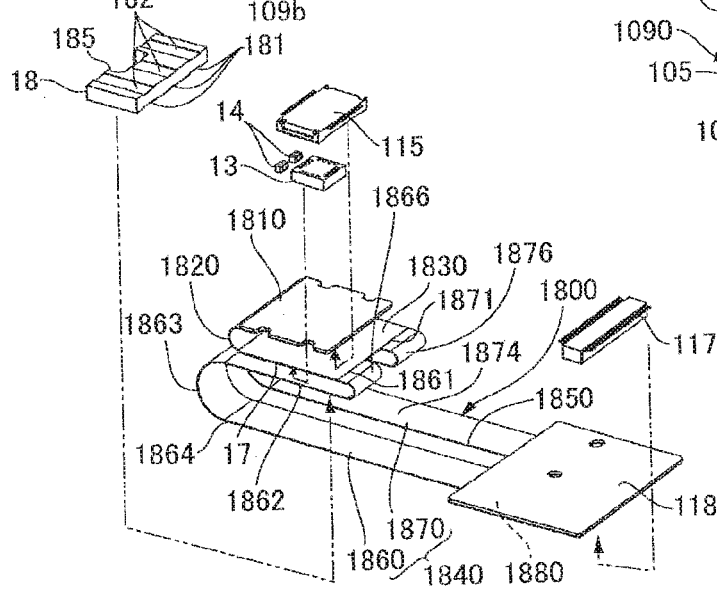

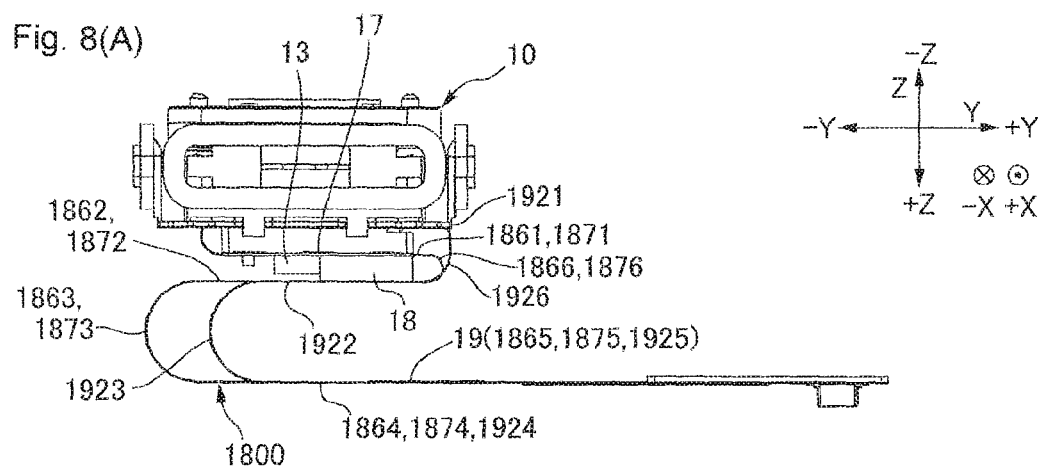
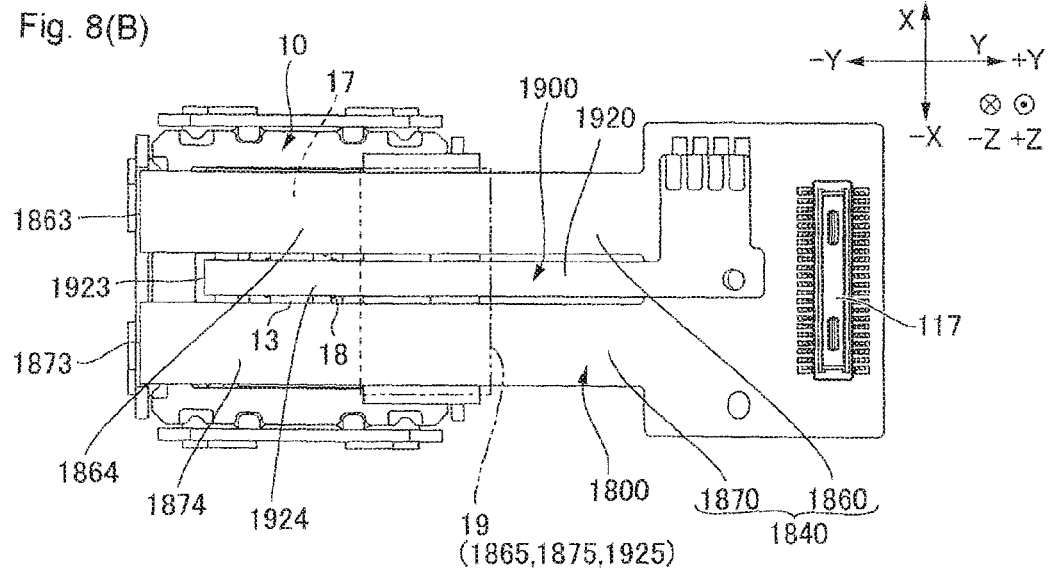

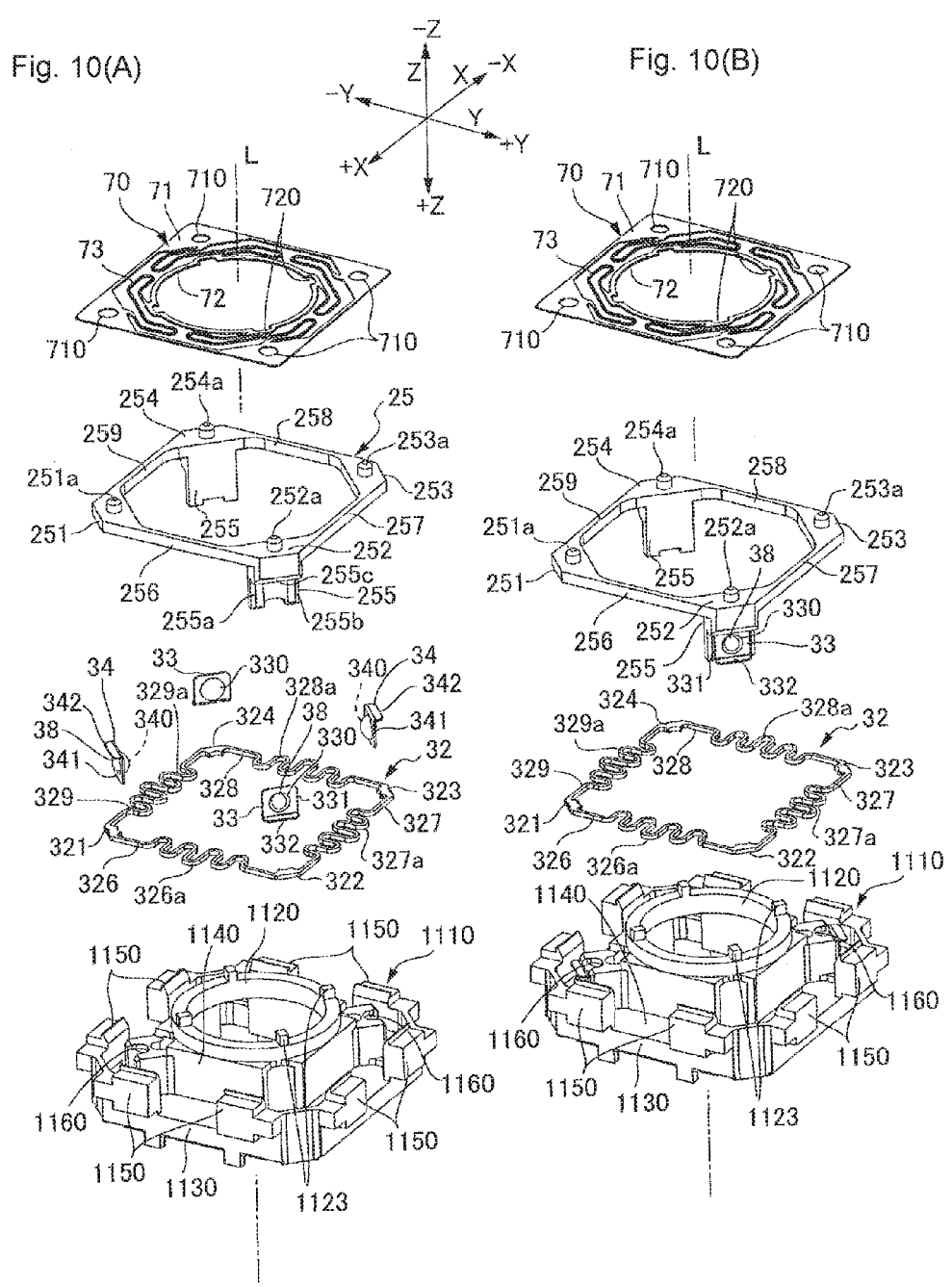

OPTICAL UNIT WITH SHAKE CORRECTION FUNCTION

CROSS REFERENCE TO RELATED APPLICATIONS

This is the U.S. national stage of application No. PCT/JP2014/073435, filed on Sep. 5, 2014. Priority under 35 U.S.C. § 119(a) and 35 U.S.C. § 365(b) is claimed from Japanese Application No. 2013-198908, filed Sep. 25, 2013, the disclosure of which is incorporated herein by reference.

FIELD OF THE INVENTION

The present invention relates to an optical unit with a shake correction function which is mounted on a cell phone with a camera or the like.

BACKGROUND

In recent years, a cell phone is structured as an optical device on which an optical unit for photographing is mounted. In the optical unit, in order to restrain disturbance of a photographed image due to a shake of a user's hand, a structure has been proposed in which an optical module is swung to correct the shake. In order to perform the shake correction, the optical module is required to be swingably supported by a fixed body.

Therefore, a structure has been proposed in which an optical module is swingably supported by a pivot provided on a rear side in an optical axis direction of the optical module and the optical module is swung with the pivot as a swing center so as to correct a shake of the optical unit (see Patent Literatures 1 and 2).

However, in a case that an optical module is structured to swing with its rear side in an optical axis direction as a swing center, a displacement amount of the optical module is small on the rear side in the optical axis direction, but a displacement amount of the optical module is large on the front side in the optical axis direction. Therefore, a sufficient space is required to secure in a direction perpendicular to the optical axis direction around the optical module and thus, a size of the optical unit in the direction perpendicular to the optical axis direction becomes large.

On the other hand, a structure has been proposed that an optical module is swingably supported at a midway position in the optical axis direction of the optical module. According to this structure, a displacement amount of the optical module on the front side in the optical axis direction can be reduced (see Patent Literature 3). Further, in the optical unit described in Patent Literature 3, a structured has been proposed in which a movable module is structured so that a weight (counter weight) is provided on a rear side end part in an optical axis direction of an optical module (first movable part) and a mechanical resonance is restrained by setting a gravity center position of the movable module close to its swing center from a gravity center position of the optical module.

CITATION LIST

Patent Literature

[PTL 1] Japanese Patent Laid-Open No. 2010-96805
[PTL 2] Japanese Patent Laid-Open No. 2010-96863
[PTL 3] International Publication No. WO2010/010712, Paragraph [0291] and FIGS. 37 and 41

However, in the weight described in Patent Literature 3, a protruded part is provided so as to protrude from a rear side end part in an optical axis direction to a further rear side and thus mass on a rear side in the optical axis direction of the weight is small. Therefore, although volume of the weight occupied in the optical axis direction is large, an effect for shifting the gravity center position in the optical axis direction is small.

SUMMARY

In view of the problem described above, at least an embodiment of the present invention provides an optical unit with a shake correction function which is capable of effectively bringing a gravity center position in an optical axis direction of a movable module close to a support position for the movable module even when the movable module is swingably supported at a midway position in the optical axis direction of the movable module.

In order to attain the objective, at least an embodiment of the present invention provides an optical unit with a shake correction function including a movable module which holds an optical element, a fixed body having a body part which surrounds the movable module, a support mechanism which swingably supports the movable module at a midway position in an optical axis direction of the movable module, and a shake correction drive mechanism structured to swing the movable module. The movable module includes an optical module which holds the optical element, and a weight which is provided on one side of a front side and a rear side in the optical axis direction of the optical module for shifting a gravity center position of the movable module to a support position side of the support mechanism relative to a gravity center position of the optical module in the optical axis direction. An end face of the one side of the weight is formed in a flat face which is perpendicular to the optical axis direction.

In at least an embodiment of the present invention, the support mechanism is provided at a midway position in the optical axis direction of the movable module, and the movable module is swung with the midway position in the optical axis direction of the movable module as a swing center. Therefore, even when the movable module is swung by the same angle, a displacement amount of the movable module is smaller on a front side in the optical axis direction than that of a structure that the movable module is swung with the rear side in the optical axis direction as a swing center. Accordingly, a large space in a direction perpendicular to the optical axis direction is not required to secure around the movable module and thus the size of the optical unit with a shake correction function in the direction perpendicular to the optical axis direction can be reduced. Further, in the present embodiment, the movable module includes an optical module which holds the optical element and a weight which is provided on a front side or a rear side in the optical axis direction of the optical module. Therefore, in the optical axis direction, the gravity center position of the movable module can be brought close to a support position of the support mechanism relative to the gravity center position of the optical module. Accordingly, a mechanical resonance when the movable module is swung can be suppressed. Further, the end face of the weight is formed in a flat face perpendicular to the optical axis direction and thus the mass of the weight is large in the portion which is separated the most from the support position. Therefore, the gravity center position can be effectively shifted in the optical axis direction.

In at least an embodiment of the present invention, it is preferable that the one side is the front side in the optical axis direction. In other words, it is preferable that the weight is provided on the front side in the optical axis direction of the optical module. According to this structure, even when the mass of the rear side end part in the optical axis direction of the optical module becomes larger due to the imaging element and the like provided in the rear side end part in the optical axis direction of the optical module, the gravity center position can be shifted by the weight provided on the front side in the optical axis direction so as to be brought close to the support position. Therefore, a mechanical resonance when the movable module is swung can be suppressed In at least an embodiment of the present invention, it is preferable that the weight includes a front plate part which is provided with an opening part at a position where an optical axis of the optical element is passed and is overlapped with a front side end part in the optical axis direction of the optical module from a front side in the optical axis direction, and a tube part which is bent to a rear side in the optical axis direction from an outer side edge of the front plate part and surrounds an outer side face of the front side end part. According to this structure, even when the weight having large mass is attached to the optical module, increase of the size in the optical axis direction of the movable module can be suppressed to a minimum.

In at least an embodiment of the present invention, it is preferable that the front plate part is formed in a circular plate shape, and the tube part is formed in a cylindrical tube shape. According to this structure, mass distribution of the weight is constant entirely in the circumferential direction with the optical axis as a center. Therefore, even in a case that the movable module is swung in any direction with the optical axis as a center, influence of the weight is constant. Accordingly, the shake correction drive mechanism is easily controlled.

In at least an embodiment of the present invention, it is preferable that the optical module includes a first holder which holds the optical element and a second holder which holds the first holder, the front side end part is structured of a portion of the first holder which is protruded to the front side in the optical axis direction from the second holder, and a rear side end part in the optical axis direction of the tube part of the weight is fixed to the frame through gap spaces between the front side end part and the front plate part and between the front side end part and the tube part. According to this structure, the weight is not contacted with the first holder and thus, even in a case that an attachment position of the first holder with respect to the second holder is changed, the weight can be provided in the same portion. Therefore, the gravity center position of the movable module can be appropriately shifted by the weight.

In at least an embodiment of the present invention, it is preferable that at least a front side edge of the opening part of the weight is provided with an antireflection property. According to this structure, even when the weight is made of metal, reflection on the front side in the optical axis direction can be prevented.

In at least an embodiment of the present invention, the one side may be the rear side in the optical axis direction. In other words, it may be structured that the weight is provided on the rear side in the optical axis direction of the optical module.

In at least an embodiment of the present invention, it may be structured that the support mechanism is a gimbal mechanism.

In at least an embodiment of the present invention, the support mechanism is provided at a midway position in the optical axis direction of the movable module, and the movable module is swung with the midway position in the optical axis direction of the movable module as a swing center. Therefore, even when the movable module is swung by the same angle, a displacement amount of the movable module is smaller on the front side in the optical axis direction than that of a structure that the movable module is swung with the rear side in the optical axis direction as a swing center. Accordingly, a large space is not required to secure in a direction perpendicular to the optical axis direction around the movable module and thus the size of the optical unit with a shake correction function in the direction perpendicular to the optical axis direction can be reduced. Further, in the present embodiment, the movable module includes an optical module which holds the optical element and a weight which is provided on a front side or a rear side in the optical axis direction of the optical module. Therefore, in the optical axis direction, the gravity center position of the movable module can be brought close to a support position of the support mechanism relative to the gravity center position of the optical module. Accordingly, a mechanical resonance when the movable module is swung can be suppressed. Further, the end face of the weight is formed in a flat face perpendicular to the optical axis direction and thus the mass of the weight is large in the portion which is separated the most from the support position. Therefore, the gravity center position can be effectively shifted in the optical axis direction.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 7(A), 7(B) and 7(C) are exploded perspective views showing an optical module and the like used in the movable module shown in FIG. 6 which are viewed from an object side.

FIGS. 8(A) and 8(B) are explanatory views showing flexible circuit boards of an optical unit with a shake correction function to which at least an embodiment of the present invention is applied.

FIGS. 10(A) and 10(B) are explanatory views showing a gimbal mechanism and the like which are used in an optical unit with a shake correction function to which at least an embodiment of the present invention is applied.

DETAILED DESCRIPTION

An embodiment of the present invention will be described below with reference to the accompanying drawings. In the following description, a structure for preventing a hand shake to an optical module for photographing will be described as an example. Further, in the following description, three directions perpendicular to each other are set to be an "X"-axis direction, a "Y"-axis direction and a "Z"-axis direction. A first direction along an optical axis "L" ((lens optical axis/optical axis of an optical element) is set to be the "Z"-axis direction, a second direction intersecting the "Z"-axis direction (first direction) is set to be the "Y"-axis direction, and a third direction intersecting the "Z"-axis direction (first direction) and the "Y"-axis direction (second direction) is set to be the "X"-axis direction. Further, in the following description, regarding swings of the respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" is indicated on one side in the "X"-axis direction, "−X" is indicated on the other side, "+Y" is indicated on one side in the "Y"-axis direction, "−Y" is indicated on the other side, "+Z" is indicated on one side in the "Z"-axis direction (opposite side to an object side/rear side in an optical axis direction), and "−Z" is indicated on the other side (object side/front side in the optical axis direction).

(Entire Structure of Optical Unit for Photographing)

Figure 1:
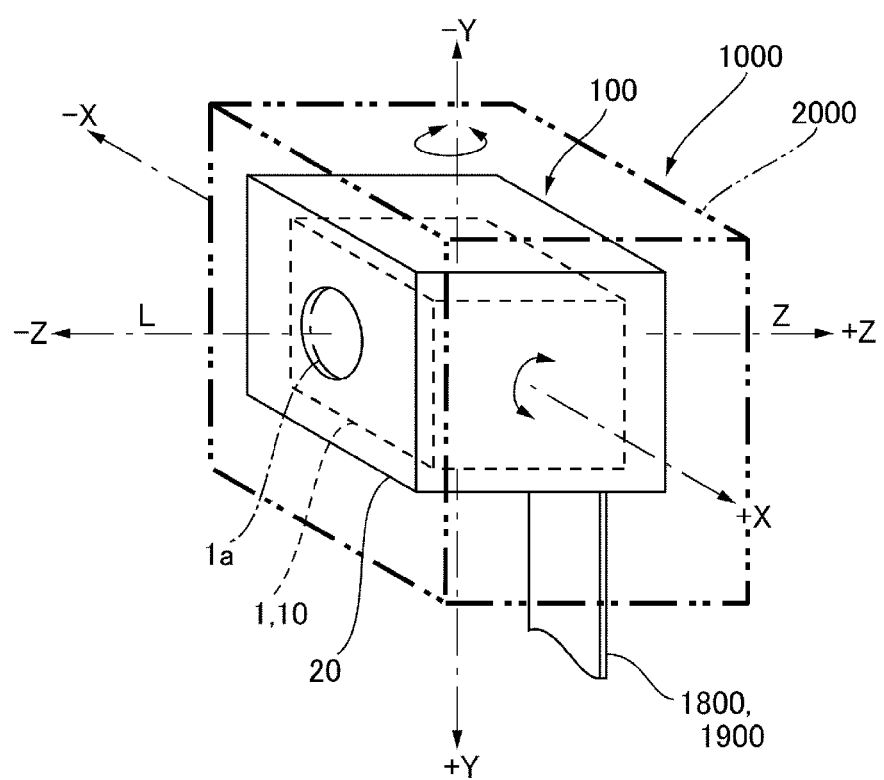
FIG. 1 is an explanatory view schematically showing a state that an optical unit with a shake correction function to which at least an embodiment of the present invention is applied is mounted on an optical device such as a cell phone.

FIG. 1 is an explanatory view schematically showing a state that an optical unit with a shake correction function to which at least an embodiment of the present invention is applied is mounted on an optical device such as a cell phone.

An optical unit 100 (optical unit with a shake correction function) shown in FIG. 1 is a thin camera which is used in an optical device 1000 such as a cell phone with a camera and is mounted in a supported state by a chassis 2000 (device main body) of the optical device 1000. In the optical unit 100, when a shake such as a hand shake is occurred in the optical device 1000 at the time of photographing, disturbance occurs in a photographed image. Therefore, in the optical unit 100 in this embodiment, as described below, a movable module 10 including an optical module 1 whose optical axis "L" is extended along the "Z"-axis direction is swingably supported in an inside of a fixed body 20. Further, the optical unit 100 includes a shake correction drive mechanism (not shown in FIG. 1) structured to swing the movable module 10 based on a detected result of a hand shake by a gyroscope (shake detection sensor) mounted on the optical unit 100. Flexible circuit boards 1800 and 1900 are extended from the optical unit 100 for supplying power to the optical module 1 and the shake correction drive mechanism. The flexible circuit boards 1800 and 1900 are electrically connected with a host control section and the like provided on a main body side of the optical device 1000. In the movable module 10, the optical module 1 includes a lens 1a as an optical element whose optical axis "L" is extended along the "Z"-axis direction. In this embodiment, when viewed in a direction of the optical axis "L", the lens 1a is formed in a circular shape but the movable module 10 and the optical module 1 are formed in a rectangular shape.

(Schematic Structure of Optical Unit 100)

Figure 2A:
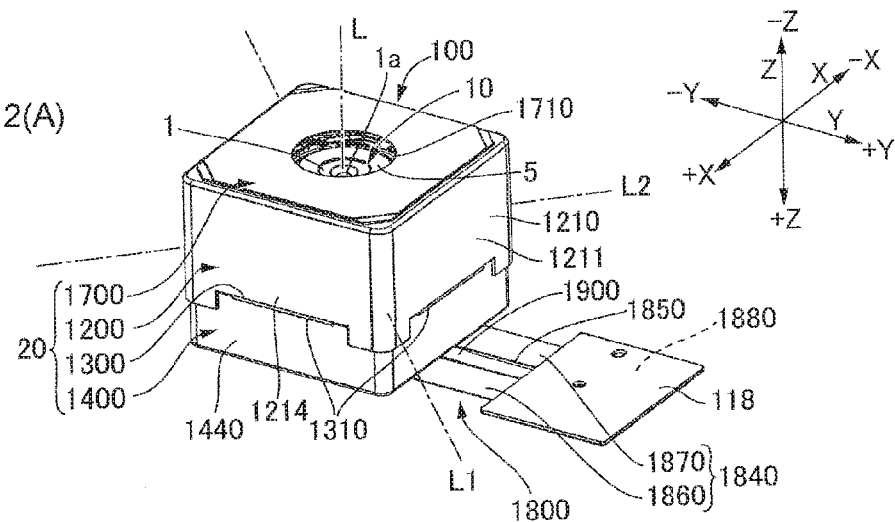
FIGS. 2(A) and 2(B) are explanatory views showing an optical unit with a shake correction function to which at least an embodiment of the present invention is applied and which is viewed from an object to be photographed side.
Figure 2B:
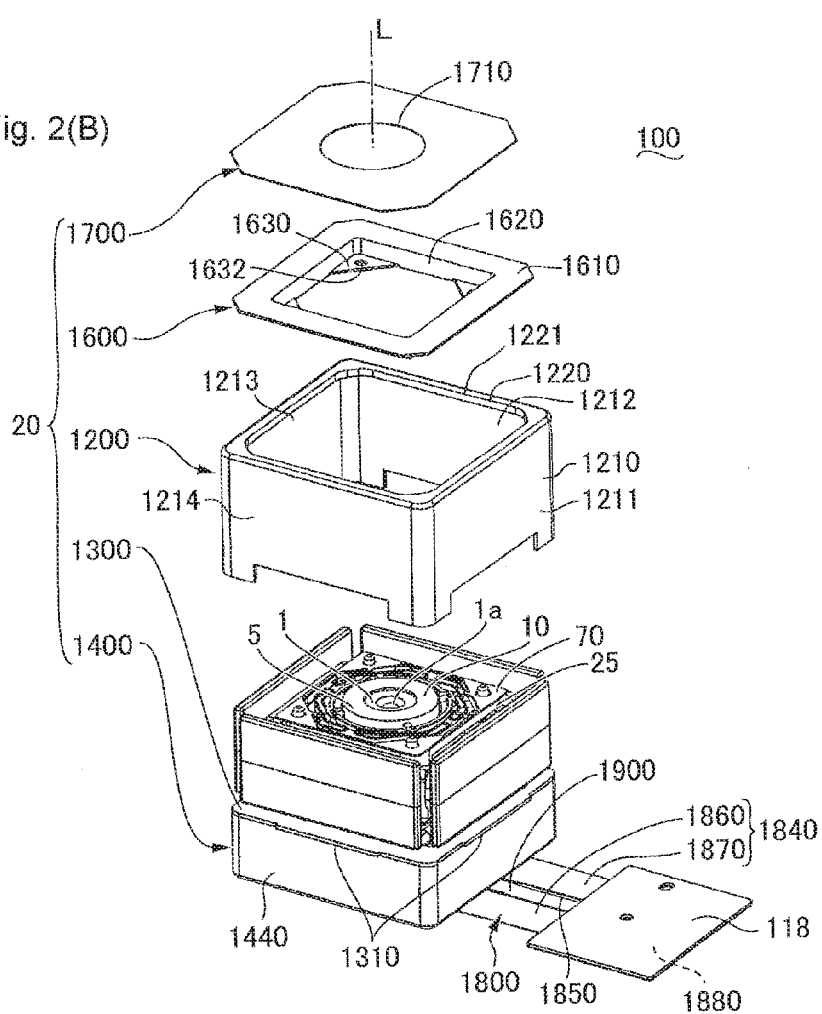
Figure 3A:
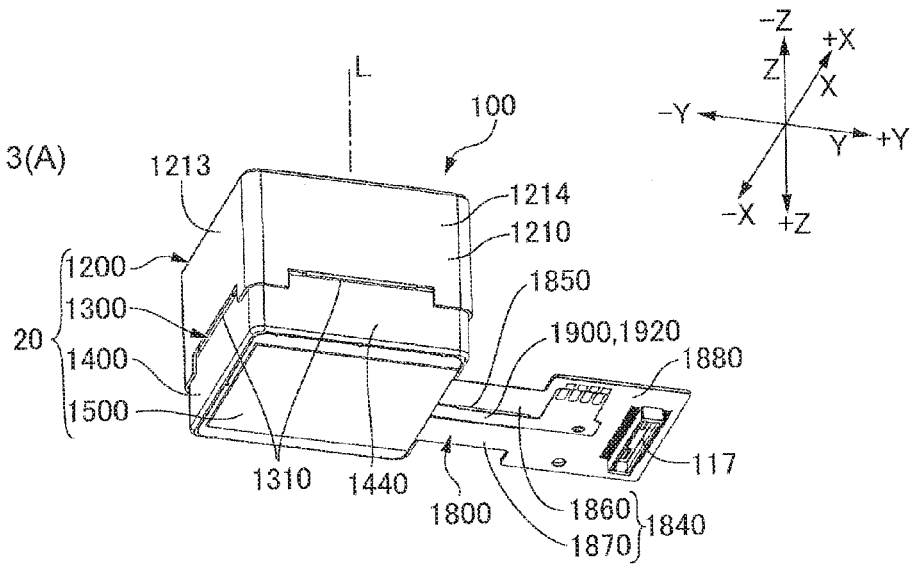
FIGS. 3(A) and 3(B) are explanatory views showing an optical unit with a shake correction function to which at least an embodiment of the present invention is applied and which is viewed from an opposite side to an object to be photographed side.
Figure 3B:
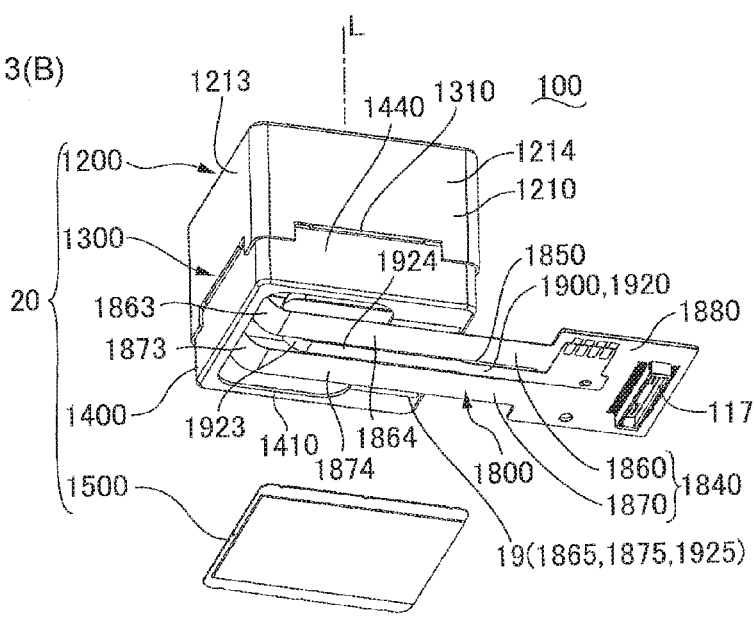
Figure 4A:
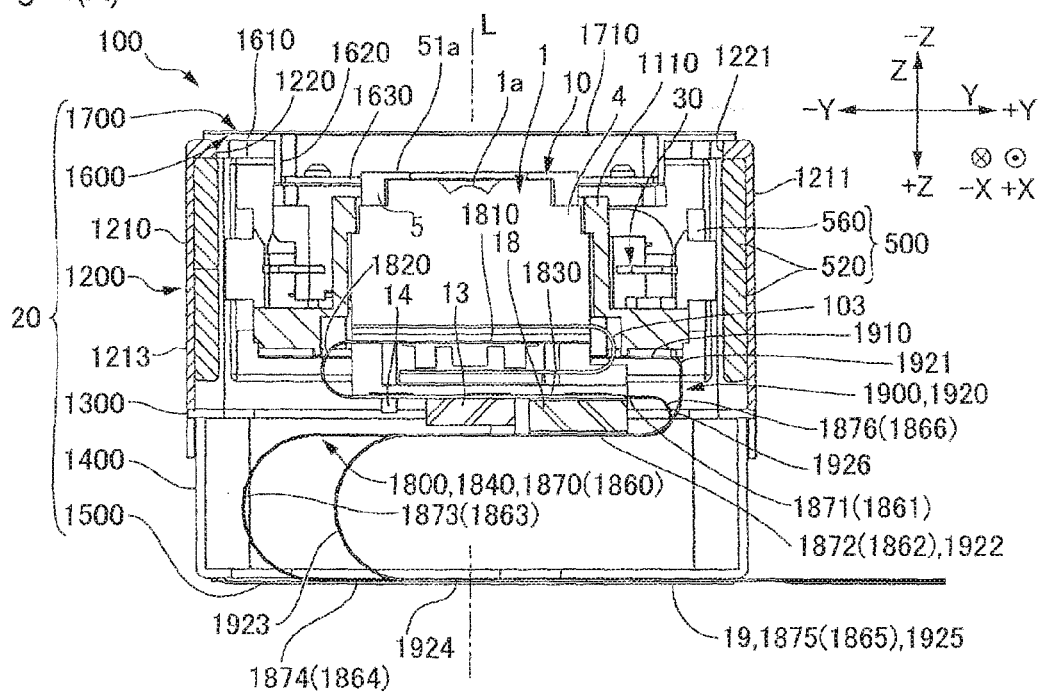
FIGS. 4(A) and 4(B) are explanatory cross-sectional views showing an optical unit with a shake correction function to which at least an embodiment of the present invention is applied.
Figure 4B:
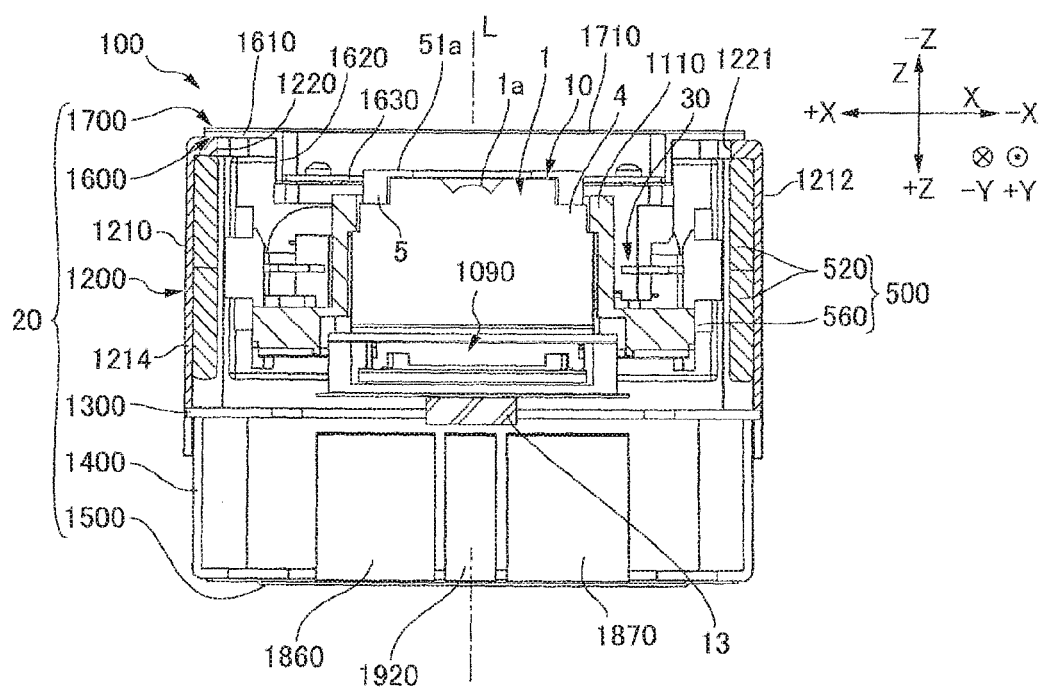
Figure 5:
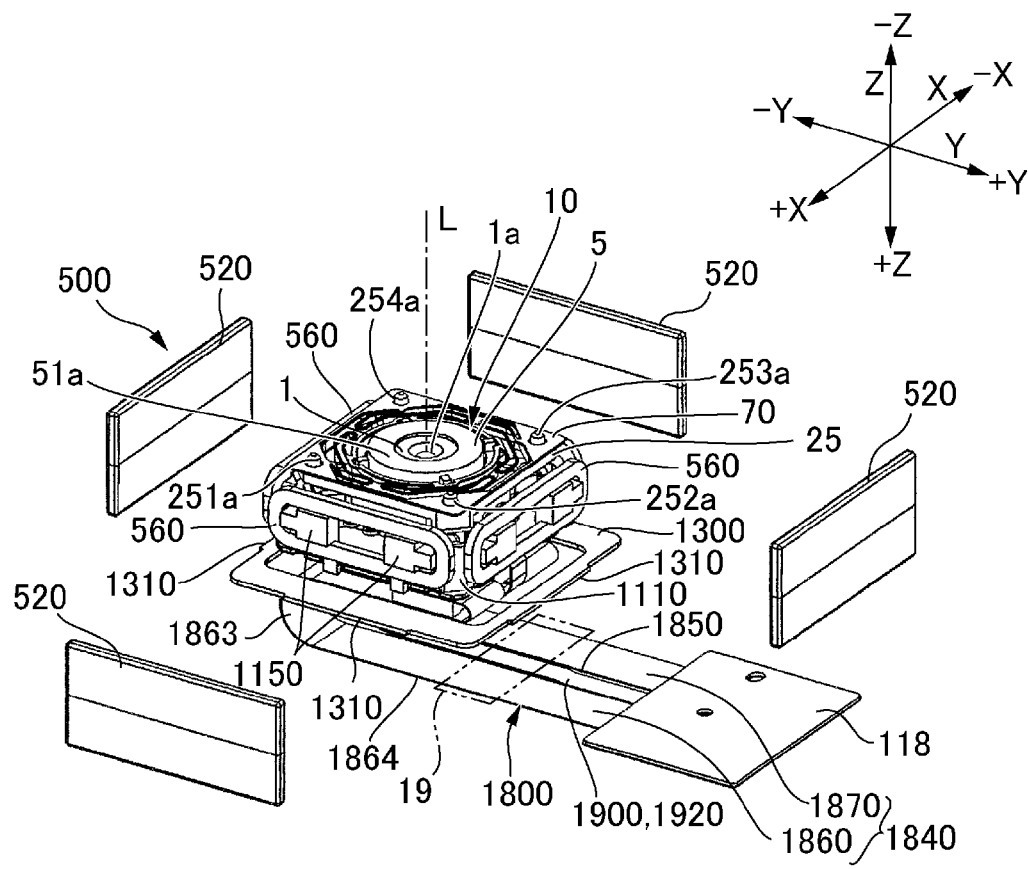
FIG. 5 is an exploded perspective view showing an inside of an optical unit with a shake correction function to which at least an embodiment of the present invention is applied and which is disassembled.

FIGS. 2(A) and 2(B) are explanatory views showing an optical unit 100 with a shake correction function to which at least an embodiment of the present invention is applied and which is viewed from an object to be photographed side (the other side "−Z" in the "Z"-axis direction). FIG. 2(A) is a perspective view showing the optical unit 100 which is viewed from an object side and FIG. 2(B) is an exploded perspective view showing the optical unit 100. FIGS. 3(A) and 3(B) are explanatory views showing the optical unit 100 with a shake correction function to which at least an embodiment of the present invention is applied and which is viewed from an opposite side to an object to be photographed side (one side "+Z" in the "Z"-axis direction). FIG. 3(A) is a perspective view showing the optical unit 100 which is viewed from an opposite side to an object side and FIG. 3(B) is an exploded perspective view showing the optical unit 100. FIGS. 4(A) and 4(B) are explanatory cross-sectional views showing the optical unit 100 with a shake correction function to which at least an embodiment of the present invention is applied. FIG. 4(A) is a "Y-Z" cross-sectional view showing the optical unit 100 and FIG. 4(B) is a "Z-X" cross-sectional view showing the optical unit 100. FIG. 5 is an exploded perspective view showing an inside of the optical unit 100 with a shake correction function in detail to which at least an embodiment of the present invention is applied. In FIG. 4(A), portions of a first belt-shaped part 1860 corresponding to a second belt-shaped part 1870 are indicated by using reference signs with a parenthesis.

In FIGS. 2(A) and 2(B), FIGS. 3(A) and 3(B), FIGS. 4(A) and 4(B) and FIG. 5, the optical unit 100 in this embodiment includes a fixed body 20, a movable module 10, a gimbal mechanism 30 (see FIGS. 4(A) and 4(B)) as a support mechanism which supports the movable module 10 in a swingable state with respect to the fixed body 20, and a shake correction drive mechanism 500 (see FIGS. 4(A) and 4(B)) structured to generate a magnetic-drive force between the movable module 10 and the fixed body 20 for relatively displacing the movable module 10 with respect to the fixed body 20.

The fixed body 20 includes a case 1200. The case 1200 is provided with a body part 1210 in a rectangular tube shape surrounding the movable module 10 and an end plate part 1220 in a rectangular frame shape which is protruded to an inner side in a radial direction from an end part on the other side "−Z" in the "Z"-axis direction of the body part 1210. A rectangular window 1221 is formed in the end plate part 1220. Further, the fixed body 20 includes a cover 1600 which is fixed to the case 1200 on the other side "−Z" in the "Z"-axis direction and a cover sheet 1700 which is fixed to the cover 1600 on the other side "−Z" in the "Z"-axis direction. The cover 1600 is provided with a plate-shaped frame part 1610 which is overlapped with the end plate part 1220 of the case 1200 and a side plate part 1620 in a rectangular tube shape which is bent to one side "+Z" in the "Z"-axis direction from an inner circumferential edge of the frame part 1610. The side plate part 1620 is inserted into an inner side of the case 1200 through an opening part 1221 of the case 1200. Four corner portions of an end part on one side "+Z" in the "Z"-axis direction of the side plate part 1620 are formed with triangular plate-shaped connecting parts 1630 and the connecting part 1630 is formed with a hole 1632 for fixing a rectangular frame 25 described below. In this embodiment, the cover sheet 1700 is formed with a window 1710 for guiding light to the optical module 1 from an object to be photographed.

(Structure of Shake Correction Drive Mechanism 500)

As shown in FIGS. 4(A) and 4(B) and FIG. 5, the shake correction drive mechanism 500 is a magnetic-drive mechanism which utilizes plate-shaped magnets 520 and coils 560. The coils 560 are held by the movable module 10 and the magnets 520 are held by inner faces of four side plate parts 1211, 1212, 1213 and 1214 of the body part 1210 of the case 1200. In this embodiment, an outer face side and an inner face side of the magnet 520 are magnetized in different poles from each other. Further, the permanent magnet 520 is divided into two magnet pieces in the optical axis "L" direction and the faces of the magnet pieces facing the coil 560 are magnetized in different poles from each other in the optical axis "L" direction. Therefore, upper and lower long side portions of the coil 560 are utilized as effective sides. In this embodiment, magnetizing patterns on outer face sides and inner face sides of the four magnets 520 are the same as each other. Therefore, the magnets 520 adjacent to each other in a circumferential direction are not attracted to each other and thus assembling is easily performed.

The case 1200 is structured of magnetic material and functions as a yoke for the magnets 520. The end plate part 1220 of the case 1200 is formed with a window 1221 whose opening edge is located on an outer side in a radial direction with respect to the faces of the magnets 520 facing the coils 560 when viewed in the "Z"-axis direction. Therefore, magnetic lines of force of the magnet 520 is suppressed from being directed to the end plate part 1220 of the case 1200 (yoke) on a front side in the optical axis "L" direction.

(Structure of Movable Module 10)

Figure 6:
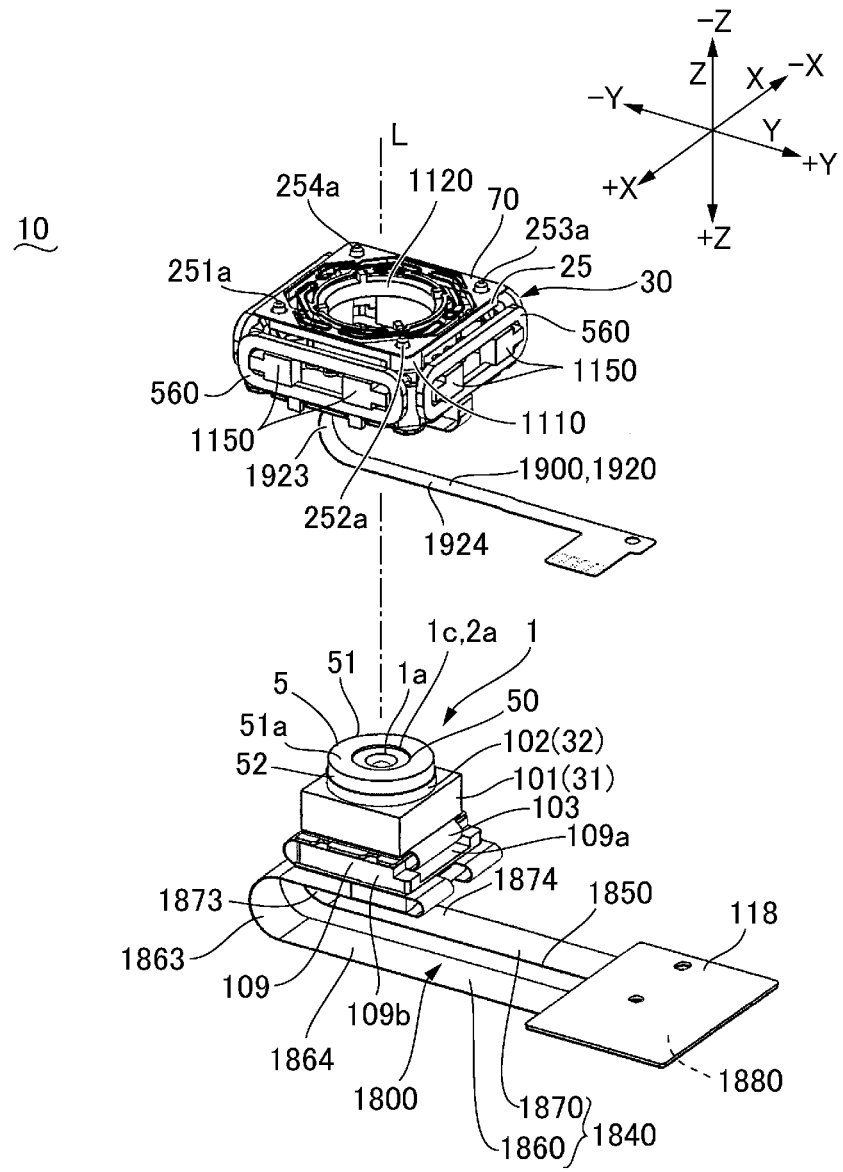
FIG. 6 is an exploded perspective view showing a disassembled state of a movable module of an optical unit with a shake correction function to which at least an embodiment of the present invention is applied and which is viewed from an object side.

FIG. 6 is an exploded perspective view showing a disassembled state of the movable module 10 of the optical unit 100 with a shake correction function to which at least an embodiment of the present invention is applied and which is viewed from an object side (the other side "−Z" in the "Z"-axis direction). FIGS. 7(A), 7(B) and 7(C) are exploded perspective views showing the optical module 1 and the like used in the movable module 10 shown in FIG. 6 which are viewed from an object side (the other side "−Z" in the "Z"-axis direction). FIG. 7(A) is an exploded perspective view showing a state in which the optical module 1 and a flexible circuit board 1800 are disassembled, FIG. 7(B) is an exploded perspective view showing a state in which the optical module 1 and the like are further disassembled, and FIG. 7(C) is an explanatory view showing an imaging element 1b and the like.

As shown in FIGS. 4(A) and 4(B), FIG. 5 and FIG. 6, the movable module 10 includes the optical module 1 having a lens 1a (optical element) and a weight 5. The optical module 1 includes a holder 4 which holds the lens 1a and a frame 1110 which holds the holder 4.

In FIGS. 4(A) and 4(B), FIGS. 5 and 6, and FIGS. 7(A), 7(B) and 7(C), the holder 4 is, for example, provided with a main body part 101 having a rectangular parallelepiped shape and a cylindrical tube part 102 which is protruded from the main body part 101 to the other side "−Z" in the "Z"-axis direction. The lens 1a and an actuator for focusing driving (not shown) are provided in an inside of the holder 4. Further, a circuit module 1090 for photographing is provided at an end part on one side "+Z" in the "Z"-axis direction of the main body part 101 and the circuit module 1090 for photographing includes a flexible mounting circuit board 103 which is bent in a "U"-shape. In the mounting circuit board 103, an imaging element 1b is mounted on a face of its portion 103a located on the other side "−Z" in the "Z"-axis direction which faces the other side "−Z" in the "Z"-axis direction. Further, a plug 105 of a "b-to-b" connector is mounted on a face of a portion 103b located on one side "+Z" in the "Z"-axis direction which faces the other side "−Z". In the mounting circuit board 103, a reinforcing plate 107 is adhesively fixed to a face of the portion 103a located on the other side "−Z" in the "Z"-axis direction which faces one side "+Z" in the "Z"-axis direction, and a reinforcing plate 108 is adhesively fixed to a face of the portion 103b located on one side "+Z" in the "Z"-axis direction which faces one side "+Z".

In the optical module 1 structured as described above, the holder 4 is held on an inner side of a frame 1110 described below and, in this state, the holder 4 is covered by a protection plate 109 from one side "+Z" in the "Z"-axis direction. The protection plate 109 is provided with a rectangular end plate part 109a which covers the frame 1110 from one side "+Z" in the "Z"-axis direction, and a side plate part 109b which is protruded to the other side "−Z" in the "Z"-axis direction from three sides except one side "+Y" in the "Y"-axis direction of four sides of the rectangular end plate part 109a.

(Structure of Signal Outputting Flexible Circuit Board 1800)

FIGS. 8(A) and 8(B) are explanatory views showing flexible circuit boards of the optical unit 100 with a shake correction function to which at least an embodiment of the present invention is applied. FIG. 8(A) is a side view showing flexible circuit boards and the like which are viewed from one side "+X" in the "X"-axis direction, and FIG. 8(B) is a bottom view showing the flexible circuit boards and the like which are viewed from one side "+Z" in the "Z"-axis direction.

As shown in FIGS. 4(A) and 4(B), FIGS. 5 and 6, FIGS. 7(A), 7(B) and 7(C), and FIGS. 8(A) and 8(B), a signal outputting flexible circuit board 1800 for outputting a signal obtained by the imaging element 1b is connected with the optical module 1. In a case that an actuator for focusing driving (not shown) is provided in an inside of the optical module 1, a drive current is supplied to the actuator through the flexible circuit board 1800.

The flexible circuit board 1800 is provided with a first connected part 1810 in a rectangular shape which is disposed between the portion 103b of the mounting circuit board 103 located on one side "+Z" in the "Z"-axis direction and the portion 103a located on the other side "−Z", a curved part 1820 which is curved toward a rear side in the optical axis "L" direction (one side "+Z" in the "Z"-axis direction) from an end part on the other side "−Y" in the "Y"-axis direction of the first connected part 1810, a second connected part 1830 in a rectangular shape which is connected with the curved part 1820 on one side "+Y" in the "Y"-axis direction, and a leading-around part 1840 which is led around from the second connected part 1830 to an outer side.

A face of the first connected part 1810 which faces one side "+Z" in the "Z"-axis direction is mounted with a socket 115 structured to engage with a plug 105. Further, a connector 117 is mounted on a face on one side "+Z" in the "Z"-axis direction of an end part 1880 on one side "+Y" in the "Y"-axis direction of the leading-around part 1840. Therefore, a signal obtained by the imaging element 1b is outputted through the mounting circuit board 103, the "b-to-b" connector (plug 105 and socket 115), the flexible circuit board 1800 and the connector 117. A reinforcing plate 118 is adhesively fixed to a face on the other side "−Z" in the "Z"-axis direction of the end part 1880.

A face on the other side "−Z" in the "Z"-axis direction of the second connected part 1830 of the flexible circuit board 1800 is fixed to a face on one side "+Z" in the "Z"-axis direction of the protection plate 109 by using an adhesive. Therefore, a rear side end face 17 in the optical axis "L" direction (end face on one side "+Z" in the "Z"-axis direction) of the movable module 10 is structured of the face on one side "+Z" in the "Z"-axis direction of the second connected part 1830 of the flexible circuit board 1800. In this embodiment, the rear side end face 17 in the optical axis "L" direction of the movable module 10 (face on one side "+Z" in the "Z"-axis direction of the second connected part 1830 of the flexible circuit board 1800) is mounted with a gyroscope 13 and electronic components 14 such as a capacitor.

In this embodiment, the leading-around part 1840 is divided into a first belt-shaped part 1860 and a second belt-shaped part 1870 parallel to each other in the "X"-axis direction by a slit 1850 extended in the "Y"-axis direction. Dimensions (width dimension) in the "X"-axis direction of the first belt-shaped part 1860 and the second belt-shaped part 1870 are equal to each other. Further, the width dimensions of the first belt-shaped part 1860 and the second belt-shaped part 1870 are larger than a width dimension of the slit 1850.

(Structure of Frame 1110)

Figure 9:
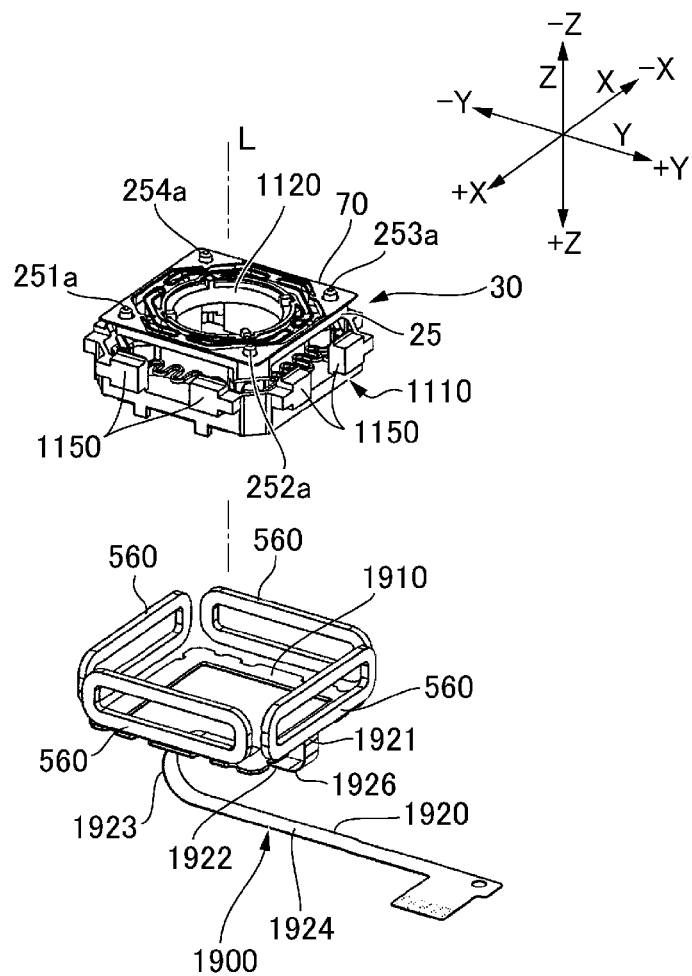
FIG. 9 is an exploded perspective view showing a frame and the like used in the movable module shown in FIG. 6 which are viewed from an object side.

FIG. 9 is an exploded perspective view showing the frame 1110 and the like used in the movable module 10 shown in FIG. 6 which are viewed from an object side (the other side "−Z" in the "Z"-axis direction). FIGS. 10(A) and 10(B) are explanatory views showing a gimbal mechanism and the like which are used in the optical unit 100 with a shake correction function to which at least an embodiment of the present invention is applied. FIG. 10(A) is an exploded perspective view showing a gimbal mechanism and the like which are viewed from an object side (the other side "−Z" in the "Z"-axis direction) and FIG. 10(B) is an explanatory view showing supporting points of the gimbal mechanism.

As shown in FIGS. 4(A) and 4(B), FIGS. 5 and 6, FIGS. 8(A) and 8(B), FIG. 9 and FIGS. 10(A) and 10(B), the frame 1110 structures an outer peripheral portion of the movable module 10. The frame 1110 is schematically provided with a holder holding part 1120 in a tube shape which holds the holder 4 on its inner side and a flange part 1130 having large thickness which is enlarged from an end part on one side "+Z" in the "Z"-axis direction of the holder holding part 1120.

As shown in FIGS. 10(A) and 10(B), a movable frame arrangement space 1140 where a movable frame 32 of the gimbal mechanism 30 is disposed and coil holding parts 1150 which respectively hold the coils 560 on an outer side with respect to the movable frame arrangement space 1140 are provided on an outer side in the radial direction with respect to the holder holding part 1120 of the frame 1110. The coil holding part 1150 is structured of a portion which is protruded toward the other side "−Z" in the "Z"-axis direction from an outer side edge of the flange part 1130 on an outer side in the radial direction with respect to the movable frame arrangement space 1140. The coil holding part 1150 is formed at four positions in a circumferential direction. In this embodiment, the coil holding parts 1150 located in the "X"-axis direction of the four coil holding parts 1150 are divided into two protruded parts in the "Y"-axis direction and the coil holding parts 1150 located in the "Y"-axis direction are divided into two protruded parts in the "X"-axis direction. The coil 560 is an air-core coil and is adhesively bonded to the coil holding part 1150 in a state that the coil holding part 1150 is fitted to an opening part of the air-core coil. In this state, a part of the coil holding part 1150 is protruded from an outer face of the coil 560 (face which faces the magnet 520).

(Structure of Flexible Circuit Board 1900 for Power Feeding)

As shown in FIGS. 5, 6 and 9, in the movable module 10, an end part on one side "+Z" in the "Z"-axis direction of the movable module 10 is connected with a flexible circuit board 1900 for power feeding to the coils 560. The flexible circuit board 1900 is provided with a rectangular frame portion 1910, which is extended along an outer side edge of the frame 1110 on one side "+Z" in the "Z"-axis direction of the frame 1110, and a leading-around part 1920 in a belt shape which is extended from the rectangular frame portion 1910. The four coils 560 are connected with the rectangular frame portion 1910.

In this embodiment, a width dimension of the leading-around part 1920 is slightly smaller than a width dimension of the slit 1850 of the flexible circuit board 1800. When viewed in the "Z"-axis direction, the leading-around part 1920 is extended on an inner side of the slit 1850 and is connected with the end part 1880 of the flexible circuit board 1800. Therefore, power feeding to the coils 560 is performed through the connector 117. Further, a width dimension of the leading-around part 1920 is smaller than the width dimensions of the first belt-shaped part 1860 and the second belt-shaped part 1870.

(Detailed Structure of Fixed Body 20)

As shown in FIGS. 2(A) and 2(B), FIGS. 3(A) and 3(B), FIGS. 4(A) and 4(B) and FIG. 5, the fixed body 20 includes a first bottom plate 1400 in a rectangular shape which covers one side "+Z" in the "Z"-axis direction of the case 1200. In this embodiment, the first bottom plate 1400 is formed with an opening part 1410 for extending the leading-around part 1840 of the flexible circuit board 1800 and the leading-around part 1920 of the flexible circuit board 1900 to an outer side. The opening part 1410 is covered by a second bottom plate 1500 which is overlapped with the first bottom plate 1400 from one side "+Z" in the "Z"-axis direction. The first bottom plate 1400 is provided with a bottom plate part 1420 in a rectangular shape and side plate parts 1440 which are protruded toward the other side "−Z" in the "Z"-axis direction from four sides of the bottom plate part 1420.

Further, the fixed body 20 includes a plate-shaped stopper 1300 in a rectangular frame shape which is disposed so as to surround the movable module 10. In this embodiment, a portion located on an inner peripheral side of the plate-shaped stopper 1300 is overlapped with a portion of the frame 1110 of the movable module 10 where the rectangular frame portion 1910 of the flexible circuit board 1900 is adhesively bonded on one side "+Z" in the "Z"-axis direction. Therefore, the plate-shaped stopper 1300 restricts a movable range of the movable module 10 to one side "+Z" in the "Z"-axis direction.

An outer circumferential edge of each side of the plate-shaped stopper 1300 is formed with a protruded part 1310 which is protruded toward an outer side. Therefore, when the first bottom plate 1400 and the case 1200 are overlapped with each other in the "Z" direction, the protruded parts 1310 of the plate-shaped stopper 1300 are held between the side plate part 1440 of the first bottom plate 1400 and the side plate parts 1211, 1212, 1213 and 1214 of the case 1200. Accordingly, when the side plate part 1440 of the first bottom plate 1400, the side plate parts 1211, 1212, 1213 and 1214 of the case 1200, and the protruded parts 1310 of the plate-shaped stopper 1300 are joined to each other by welding or the like, the first bottom plate 1400, the plate-shaped stopper 1300 and the case 1200 are integrated with each other.

(Structure of Gimbal Mechanism 30)

In the optical unit 100 in this embodiment, in order to correct a shake of hand, the movable module 10 is required to be swingably supported around a first axial line "L1" (see FIG. 2(A)) intersecting the optical axis "L" direction, and the movable module 10 is required to be swingably supported around a second axial line "L2" (see FIG. 2(A)) intersecting the optical axis "L" direction and the first axial line "L1". Therefore, a gimbal mechanism 30 (support mechanism) described below is structured between the movable module 10 and the fixed body 20.

As shown in FIGS. 10(A) and 10(B), in this embodiment, in order to structure the gimbal mechanism 30, the movable frame 32 is used which is formed in a rectangular shape and is fixed to the cover 1600 (see FIG. 2(B)) through the rectangular frame 25. The movable frame 32 is provided with a first corner part 321, a second corner part 322, a third corner part 323 and a fourth corner part 324 around the optical axis "L". The movable frame 32 is provided with a first connecting part 326, a second connecting part 327, a third connecting part 328 and a fourth connecting part 329 between the first corner part 321 and the second corner part 322, between the second corner part 322 and the third corner part 323, between the third corner part 323 and the fourth corner part 324, and between the fourth corner part 324 and the first corner part 321. In this embodiment, the first connecting part 326, the second connecting part 327, the third connecting part 328 and the fourth connecting part 329 are provided with meandering parts 326a, 327a, 328a and 329a which are curved in a direction perpendicular to each of their extended directions and the "Z"-axis direction.

In this embodiment, a metal ball 38 is fixed to inner sides of the first corner part 321, the second corner part 322, the third corner part 323 and the fourth corner part 324 of the movable frame 32 by welding or the like. The ball 38 structures a protruded part whose hemispheric convex face is directed toward an inner side in the radial direction.

Further, the end plate part 1220 of the case 1200 (fixed body 20) is fixed with the cover 1600 and the rectangular frame 25 is fixed to the connecting parts 1630 of the cover 1600. The rectangular frame 25 is provided with a first corner part 251, a second corner part 252, a third corner part 253 and a fourth corner part 254 around the optical axis "L". The rectangular frame 25 is provided with a first side part 256, a second side part 257, a third side part 258 and a fourth side part 259 between the first corner part 251 and the second corner part 252, between the second corner part 252 and the third corner part 253, between the third corner part 253 and the fourth corner part 254, and between the fourth corner part 254 and the first corner part 251. The first corner part 251, the second corner part 252, the third corner part 253 and the fourth corner part 254 are formed with protruded parts 251a, 252a, 253a and 254a which are protruded toward the other side "−Z" in the "Z"-axis direction. The rectangular frame 25 is fixed to the cover 1600 in a state that the protruded parts 251a, 252a, 253a and 254a are fitted to the holes 1632 formed in the connecting parts 1630 of the cover 1600.

The rectangular frame 25 is provided with support plate parts 255 which are protruded to one side "+Z" in the "Z"-axis direction (the other side in the optical axis "L" direction) from the second corner part 252 and the fourth corner part 254. In this embodiment, an outer side face in the radial direction of the support plate part 255 is formed with wall faces 255a and 255b which faces each other on both sides in the circumferential direction, and a wall face 255c which faces one side "+Z" in the "Z"-axis direction. Therefore, a recessed part is formed between the wall faces 255a and 255b so as to open toward an outer side in the radial direction.

A plate-shaped member 33 which is bent in an "L"-shape is fixed between the wall faces 255a and 255b. In this embodiment, the plate-shaped member 33 is provided with a first plate part 331 extended in the "Z"-axis direction and a second plate part 332 which is bent toward an outer side in the radial direction at an end part on one side "+Z" in the "Z"-axis direction of the first plate part 331. The first plate part 331 is fixed to the wall face 255c and the wall faces 255a and 255b of the support plate part 255 formed in the rectangular frame 25. Therefore, in each of the second corner part 252 and the fourth corner part 254 of the rectangular frame 25, a recessed part which opens toward an outer side in the radial direction is formed so as to be surrounded by the second plate part 332 of the plate-shaped member 33 and the wall faces 255a, 255b and 255c of the support plate part 255. The first plate part 331 of the plate-shaped member 33 is located on an inner side in the radial direction of the recessed part. In this embodiment, an outer side face in the radial direction of the first plate part 331 is formed with a receiving part 330 which is recessed in a hemispheric shape.

Further, on an outer peripheral side of the holder holding part 1120 of the frame 1110 which is protruded from one side "+Z" in the "Z"-axis direction (the other side in the optical axis "L" direction) toward the other side "−Z" in the "Z"-axis direction (one side in the optical axis "L" direction), recessed parts 1160 are formed in portions on one side "+X" in the "X"-axis direction and the other side "−Y" in the "Y"-axis direction, and on the other side "−X" in the "X"-axis direction and one side "+Y" in the "Y"-axis direction.

In this embodiment, a plate-shaped member 34 which is bent in an "L" shape is fixed so as to close the recessed part 1160 from the outer side in the radial direction. In this embodiment, the plate-shaped member 34 is provided with a first plate part 341 extended in the "Z"-axis direction and a second plate part 342 which is bent toward an outer side in the radial direction at an end part on the other side "−Z" in the "Z"-axis direction of the first plate part 341. In this embodiment, a receiving part 340 which is recessed in a hemispheric shape is formed on an outer side face in the radial direction of the first plate part 341.

The movable module 10 is swingably supported around the first axial line "L1" intersecting the optical axis "L" direction and is swingably supported around the second axial line "L2" intersecting the optical axis "L" direction and the first axial line "L1" by using the rectangular frame 25, the movable frame 32, the balls 38, the plate-shaped members 33 and 34 and the flame 1110 structured as described above. More specifically, in the swing support part between the second corner part 322 of the movable frame 32 and the second corner part 252 of the rectangular frame 25 and, in the swing support part between the fourth corner part 324 of the movable frame 32 and the fourth corner part 254 of the rectangular frame 25, the plate-shaped members 33 are located on the inner sides of the second corner part 322 and the fourth corner part 324 of the movable frame 32 and thus the balls 38 are supported by the receiving parts 330. As a result, the second corner part 322 and the fourth corner part 324 of the movable frame 32 located on the first axial line "L1" are swingably supported by the second corner part 252 and the fourth corner part 254 of the rectangular frame 25 (fixed body 20).

Further, in the swing support part between the first corner part 321 of the movable frame 32 and the frame 1110 and, in the swing support part between the third corner part 323 of the movable frame 32 and the frame 1110, the plate-shaped members 34 provided in the frame 1110 are located on the inner sides of the first corner part 321 and the third corner part 323 of the movable frame 32 and the balls 38 are supported by the receiving parts 340. As a result, the first corner part 321 and the third corner part 323 of the movable frame 32 located on the second axial line "L2" swingably support the frame 1110 (movable module 10).

As structured as described above, the movable module 10 is swingably supported by the fixed body 20 around the first axial line "L1" and around the second axial line "L2" through the movable frame 32 used in the gimbal mechanism 30.

In this embodiment, each of the movable frame 32 and the plate-shaped members 33 and 34 is located at the same height position (the same position in the "Z"-axis direction) as the coil holding parts 1150. Therefore, when viewed in a direction perpendicular to the optical axis "L" direction, the gimbal mechanism 30 is provided at a position overlapped with the shake correction drive mechanism 500. Especially, in this embodiment, when viewed in a direction perpendicular to the optical axis "L" direction, the gimbal mechanism 30 is provided at a position overlapping with the center in the "Z"-axis direction of the shake correction drive mechanism 500.

In this embodiment, the movable frame 32 is structured of metal material or the like having elasticity and the movable frame 32 is provided with elasticity which is not resiliently bent by the own weight of the movable module 10 but, when an impact is applied from an outer side, the impact can be absorbed. Further, the first connecting part 326, the second connecting part 327, the third connecting part 328 and the fourth connecting part 329 of the movable frame 32 are respectively capable of being elastically deformed to inner sides and outer sides in the radial direction. Therefore, the balls 38 and the receiving parts 330 and 340 are elastically contacted with each other in all of the first corner part 321, the second corner part 322, the third corner part 323 and the fourth corner part 324 by elasticities of the first connecting part 326, the second connecting part 327, the third connecting part 328 and the fourth connecting part 329. Accordingly, rattling is not occurred between the balls 38 and the receiving parts 330 and 340.

(Structure of Plate-Shaped Spring 70)

The movable module 10 in this embodiment includes a plate-shaped spring 70 which is connected with the movable module 10 and the fixed body 20 to hold a posture of the movable module 10 when the shake correction drive mechanism 500 is set in a stopped state. In this embodiment, the plate-shaped spring 70 is a spring member which is made by forming a metal plate in a predetermined shape and is provided with a fixed body side connecting part 71 in a rectangular frame shape, a movable body side connection part 72 in a circular ring shape, and plate spring parts 73 which connect the fixed body side connecting part 71 with the movable body side connection part 72. In this embodiment, the plate spring part 73 is extended from a corner portion of the fixed body side connecting part 71 to the movable body side connection part 72 while meandering from one side to the other side in a circumferential direction.

The fixed body side connecting part 71 is fixed to a face on the other side "−Z" in the "Z"-axis direction of the rectangular frame 25, and the movable body side connection part 72 is fixed to an end face on the other side "−Z" in the "Z"-axis direction of the holder holding part 1120 of the frame 1110 by welding, an adhesive or the like. More specifically, the fixed body side connecting part 71 is fixed to the rectangular frame 25 in a state that the protruded parts 251a, 252a, 253a and 254a of the rectangular frame 25 are fitted to holes 710 of the fixed body side connecting part 71. Further, protruded parts 1123 are formed on the end face on the other side "−Z" in the "Z"-axis direction of the holder holding part 1120 and the movable body side connection part 72 is fixed to the holder holding part 1120 in a state that the protruded parts 1123 are fitted to cut-out parts 720 of the movable body side connection part 72.

The gimbal mechanism 30 is provided at a position overlapping with the center in the "Z"-axis direction of the shake correction drive mechanism 500 and, on the other hand, the plate-shaped spring 70 is located on the other side "−Z" in the "Z"-axis direction relative to the position overlapping with the center in the "Z"-axis direction of the shake correction drive mechanism 500.

In this embodiment, the gimbal mechanism 30 and the shake correction drive mechanism 500 are provided at a midway position in the "Z"-axis direction of the movable module 10. Especially, in this embodiment, the gimbal mechanism 30 and the shake correction drive mechanism 500 are provided at a middle position (center position) in the "Z"-axis direction of the movable module 10. Further, the gimbal mechanism 30 and the shake correction drive mechanism 500 are provided in the "Z"-axis direction at the same position as a gravity center position in the "Z"-axis direction of the movable module 10. The position of a center of gravity of the optical module 1 is shifted to one side "+Z" in the "Z"-axis direction relative to a middle position in the "Z"-axis direction. However, in this embodiment, as shown in FIGS. 7(A), 7(B) and 7(C), the movable module 10 includes a weight 5 which is attached to an end part on the other side "−Z" in the "Z"-axis direction of the optical module 1. Therefore, the gravity center position of the movable module 10 in the optical axis "L" direction is shifted by the weight 5 to a support position side of the gimbal mechanism 30 (support mechanism) relative to the gravity center position of the optical module 1. Accordingly, the gravity center position of the movable module 10 is located at a middle position (center position) in the "Z"-axis direction of the movable module 10 and the gimbal mechanism 30 is provided at the same position as the gravity center position in the "Z"-axis direction.

[Detailed Structure of Weight 5 and the Like]

Figure 11A:
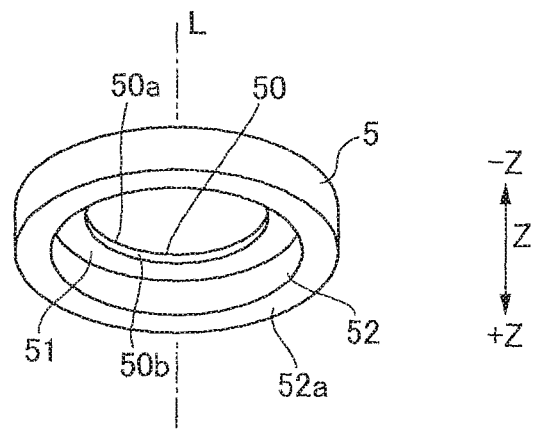
FIGS. 11(A), 11(B) and 11(C) are explanatory views showing a weight and the like which are used in the movable module shown in FIG. 6.
Figure 11B:
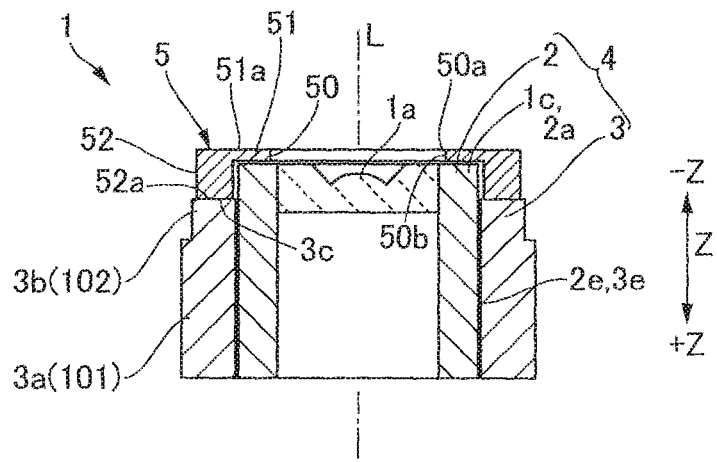
Figure 11C:
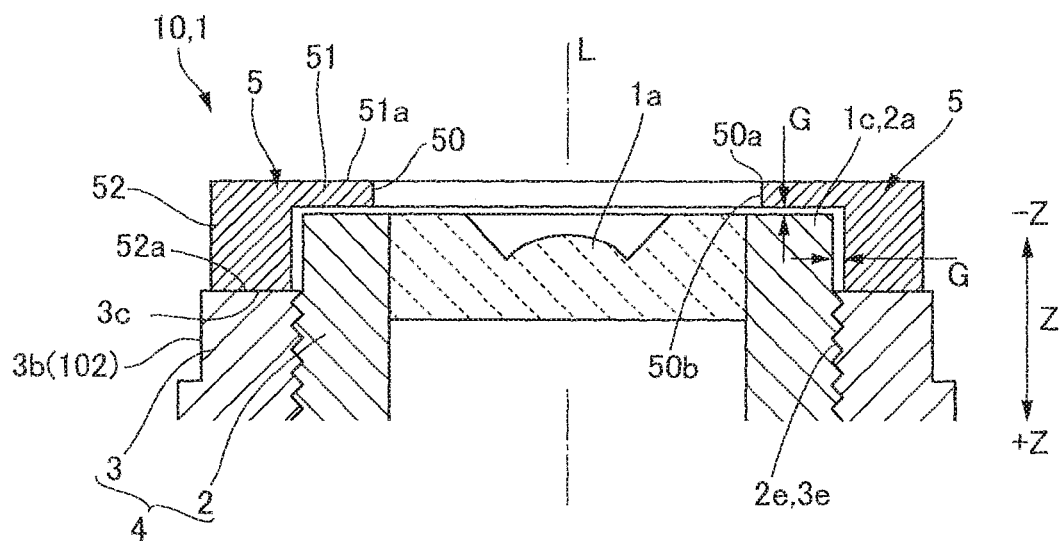

FIGS. 11(A), 11(B) and 11(C) are explanatory views showing the weight 5 and the like which are used in the movable module shown in FIG. 6. FIG. 11(A) is a perspective view showing the weight 5 viewed from a rear side in the optical axis "L" direction (one side "+Z" in the "Z"-axis direction), FIG. 11(B) is a cross-sectional view showing a state that the weight 5 is attached to the optical module 1, and FIG. 11(C) is an enlarged cross-sectional view showing a portion where the weight 5 is attached to the optical module 1.

As shown in FIGS. 11(A), 11(B) and 11(C), the weight 5 is provided with a front plate part 51, which is formed with an opening part 50 at a position where the optical axis "L" is passed, and a tube part 52 which is bent from an outer side edge of the front plate part 51 toward the rear side in the optical axis "L" direction (one side "+Z" in the "Z"-axis direction). A front side end face 51a in the optical axis "L" direction of the weight 5 is formed to be a flat face perpendicular to the optical axis "L". In this embodiment, the front plate part 51 and the opening part 50 are formed in circular shapes and the tube part 52 is formed in a cylindrical tube shape.

The weight 5 is fixed to the holder 4 so as to cover the front side end part 1c in the optical axis "L" direction of the optical module 1. Therefore, the front plate part 51 of the weight 5 overlaps with the front side end part 1c of the optical module 1 from a front side in the optical axis "L" direction and the tube part 52 surrounds an outer side face of the front side end part 1c over the entire periphery.

The holder 4 of the optical module 1 includes a first holder 2 in a tube shape holding the lens 1a and a second holder 3 in a tube shape holding the first holder 2. The main body part 101 in a rectangular parallelepiped shape shown in FIGS. 7(A), 7(B) and 7(C) is structured of a rectangular tube part 31 of the second holder 3, and the cylindrical tube part 102 shown in FIGS. 7(A), 7(B) and 7(C) is structured of a cylindrical tube part 32 of the second holder 3. A part of the first holder 2 is protruded to a front side in the optical axis "L" direction from the front end face 32a of the cylindrical tube part 32 of the second holder 3 and the front side end part 1c of the optical module 1 is structured of a portion 2a of the first holder 2 which is protruded from the second holder 3 to a front side in the optical axis "L" direction. The first holder 2 is, for example, held by the second holder 3 through a male screw 2e formed on an outer peripheral face of the first holder 2 and a female screw 3e formed on an inner peripheral face of the second holder 3. In the drawing, only one piece of the lens 1a is held in the first holder 2, but in this embodiment, a plurality of lenses, a diaphragm and the like (not shown) are held in the first holder 2.

The weight 5 is fixed to the holder 4 of the optical module 1 structured as described above, in other words, the rear side end part 52a in the optical axis "L" direction of the tube part 52 is fixed to the front end face 32a of the second holder 3 by using an adhesive or the like so that a gap space "G" is provided between the front side end part 2a and the front plate part 51 and between the front side end part 2a and the tube part 52. Therefore, the weight 5 is not contacted with the first holder 2.

In this embodiment, the weight 5 is made of nonmagnetic metal and is, for example, made of brass. Therefore, a magnetic attraction force is not generated between the weight 5 and the magnets 520. In this embodiment, in a case that light is incident into the optical module 1 from a front side in the optical axis "L" direction, when the light reflected by the weight 5 is incident into the optical module 1, the light becomes stray light to degrade the quality of an image. Therefore, in this embodiment, at least a front side edge 50a of the opening part 50 of the weight 5 is structured to provide with an antireflection property. For example, processing such as black coating is performed on the front side edge 50a of the opening part 50 of the weight 5. In this embodiment, processing such as black coating is performed on the entire inner peripheral face 50b in addition to the edge 50a of the opening part 50 of the weight 5. In accordance with an embodiment of the present invention, black coating, coating of black resin or the like may be processed on the entire surface of the weight 5.

(Structure and Basic Operation of Shake Correction Drive Mechanism 500 and the Like)

In the optical unit 100 structured as described above, when the optical device 1000 shown in FIG. 1 is shaken, the shake is detected by the gyroscope 13 and a control IC (not shown) controls the shake correction drive mechanism 500. In other words, a drive current for canceling the shake detected by the gyroscope 13 is supplied to the coils 560. In this case, a part (parts) of the four coils 560 is supplied with an electric current and the electric current is not supplied to other coils 560. Alternatively, all of the four coils 560 are supplied with electric currents but the balance of the electric currents supplied to the four coils 560 is controlled. As a result, the movable module 10 is swung around the first axial line "L1" or around the second axial line "L2" and the shake of hand is corrected. Alternatively, the movable module 10 is swung around the first axial line "L1" and is swung around the second axial line "L2" and the shake of hand is corrected.

(Leading-Around Structure of Flexible Circuit Boards 1800 and 1900)

As shown in FIGS. 3(A) and 3(B), in the optical unit 100 in this embodiment, the bottom plate part 1420 of the first bottom plate 1400 is formed with an opening part 1410. The leading-around part 1840 of the flexible circuit board 1800 and the leading-around part 1920 of the flexible circuit board 1900 connected with the movable module 10 are extended to an outer side of the optical unit 100 through the opening part 1410. In at least an embodiment of the present invention, the "first flexible circuit board", the "second flexible circuit board" and the "third flexible circuit board" respectively correspond to the first belt-shaped part 1860, the second belt-shaped part 1870 and the leading-around part 1920 as described below.

The first belt-shaped part 1860=the first flexible circuit board

The second belt-shaped part 1870=the second flexible circuit board

The leading-around part 1920=the third flexible circuit board

As shown in FIGS. 4(A) and 4(B) and FIGS. 8(A) and 8(B), the flexible circuit board 1800 is led out from one side "+Y" in the "Y"-axis direction relative to the optical axis "L" in the rear side end face 17 in the optical axis "L" direction of the movable module 10. In this embodiment, the flexible circuit board 1800 is led out from an end part on one side "+Y" in the "Y"-axis direction in the rear side end face 17 in the optical axis "L" direction of the movable module 10 and a boundary portion between the second connected part 1830 and the leading-around part 1840 is a leading-out part. In this embodiment, the leading-around part 1840 is divided into the first belt-shaped part 1860 and the second belt-shaped part 1870. Both of the leading-out part 1861 of the first belt-shaped part 1860 and the leading-out part 1871 of the second belt-shaped part 1870 are located in the boundary portion between the second connected part 1830 and the leading-around part 1840.

The first belt-shaped part 1860 is provided with a first extended part 1862 which is extended from the leading-out part 1861 to the other side "−Y" relative to the optical axis "L" in the "Y"-axis direction, a first curved part 1863 which is curved from a tip end side of the first extended part 1862 toward a rear side in the optical axis direction (one side "+Z" in the "Z"-axis direction), and a second extended part 1864 which is extended from the first curved part 1863 toward one side "+Y" in the "Y"-axis direction. Further, the first belt-shaped part 1860 is provided with a second curved part 1866, which is curved from the leading-out part 1861 toward a rear side in the optical axis direction (one side "+Z" in the "Z"-axis direction) between the leading-out part 1861 and the first extended part 1862. The first extended part 1862 is extended from the second curved part 1866 in a state that the first extended part 1862 faces the rear side end face 17 in the optical axis "L" direction of the movable module 10 in parallel through a gap space.

A plate-shaped spacer 18 is fixed to the rear side end face 17 of the movable module 10 on one side "+Y" in the "Y"-axis direction relative to the optical axis "L" with an adhesive and the spacer 18 is disposed between the rear side end face 17 and the first extended part 1862. In this embodiment, the spacer 18 is a plate member formed in a substantially rectangular shape and a face on the other side "−Z" in the "Z"-axis direction of the spacer 18 is formed with recessed parts 182 which function as an adhesive reservoir when the spacer 18 is adhesively bonded to the rear side end face 17 of the movable module 10 with an adhesive. Further, a face on one side "+Z" in the "Z"-axis direction of the spacer 18 is formed with recessed parts 181 which function as an adhesive reservoir when the spacer 18 is adhesively bonded to the first belt-shaped part 1860, the second belt-shaped part 1870 and the leading-around part 1920 with an adhesive.

In this embodiment, a gyroscope 13 is fixed to the rear side end face 17 of the movable module 10 on an extended line of the optical axis "L". A dimension in the "Z"-axis direction (thickness dimension) of the gyroscope 13 is smaller than that of the spacer 18. Therefore, a gap space is provided between the gyroscope 13 and the first extended part 1862. Further, the gyroscope 13 is disposed at a position adjacent to the spacer 18 on the other side "−Y" in the "Y"-axis direction. The spacer 18 is formed with a recessed part 185 on the other side "−Y" in the "Y"-axis direction and a part of the gyroscope 13 is located on an inner side of the recessed part 185 of the spacer 18. Therefore, the gyroscope 13 can be disposed on the extended line of the optical axis "L".

The second extended part 1864 is extended to an outer side from its midway position through the opening part 1410 of the first bottom plate 1400 and is fixed to a face on one side "+Z" in the "Z"-axis direction of the first bottom plate 1400 on one side "+Y" in the "Y"-axis direction relative to the optical axis "L". In this embodiment, the second extended part 1864 of the first belt-shaped part 1860 is fixed to the first bottom plate 1400 with a flexible sheet 19 such as a double-sided adhesive tape and the fixed position corresponds to a fixed part 1865 of the fixed body 20. When viewed in the "Z"-axis direction, the fixed part 1865 is provided at a position overlapping with the leading-out part 1861.

Similarly to the first belt-shaped part 1860, on the other side "−X" in the "X"-axis direction relative to the first belt-shaped part 1860, the second belt-shaped part 1870 is provided with a first extended part 1872 which is extended from the leading-out part 1871 to the other side "−Y" in the "Y"-axis direction relative to the optical axis "L", a first curved part 1873 which is curved from a tip end side of the first extending part 1872 toward the rear side in the optical axis direction (one side "+Z" in the "Z"-axis direction), and a second extended part 1874 which is extended from the first curved part 1873 toward one side "+Y" in the "Y"-axis direction. Further, similarly to the first belt-shaped part 1860, the second belt-shaped part 1870 is also provided with a second curved part 1876, which is curved from the leading-out part 1871 toward the rear side in the optical axis direction (one side "+Z" in the "Z"-axis direction) between the leading-out part 1871 and the first extending part 1872. The first extended part 1872 is extended from the second curved part 1876 in a state that the first extended part 1872 faces the rear side end face 17 in the optical axis "L" direction of the movable module 10 in parallel through a gap space. Further, the spacer 18 is disposed between the rear side end face 17 and the first extended part 1872. Further, the second extended part 1874 is, similarly to the second extended part 1864, extended to an outer side from its midway position through the opening part 1410 of the first bottom plate 1400 and is fixed to the face on one side "+Z" in the "Z"-axis direction of the first bottom plate 1400 by the flexible sheet 19 on one side "+Y" in the "Y"-axis direction relative to the optical axis "L". Therefore, the fixed position by the sheet 19 corresponds to a fixed part 1875 of the second belt-shaped part 1870 to the fixed body 20.

The leading-around part 1920 is led out from the rear side in the optical axis "L" direction of the frame 1110. Similarly to the first belt-shaped part 1860 and the second belt-shaped part 1870, at a position interposed between the first belt-shaped part 1860 and the second belt-shaped part 1870 in the "X"-axis direction, the leading-around part 1920 is provided with a first extended part 1922 which is extended from the leading-out part 1921 to the other side "−Y" in the "Y"-axis direction relative to the optical axis "L", a first curved part 1923 which is curved from a tip end side of the first extended part 1922 toward the rear side in the optical axis direction (one side "+Z" in the "Z"-axis direction), and a second extended part 1924 which is extended from the first curved part 1923 toward one side "+Y" in the "Y"-axis direction. Further, the leading-around part 1920 is, similarly to the first belt-shaped part 1860 and the second belt-shaped part 1870, also provided with a second curved part 1926, which is curved from the leading-out part 1921 toward the rear side in the optical axis direction (one side "+Z" in the "Z"-axis direction) between the leading-out part 1921 and the first extended part 1922. The first extended part 1922 is extended from the second curved part 1926 in a state that the first extended part 1922 faces the rear side end face 17 in the optical axis "L" direction of the movable module 10 in parallel through a gap space. Further, the spacer 18 is disposed between the rear side end face 17 and the first extended part 1922. Further, the second extended part 1924 is, similarly to the second extended parts 1864 and 1874, extended to an outer side from its midway position through the opening part 1410 of the first bottom plate 1400 and is fixed to the face on one side "+Z" in the "Z"-axis direction of the first bottom plate 1400 by the flexible sheet 19 on one side "+Y" in the "Y"-axis direction relative to the optical axis "L". Therefore, the fixed position by the sheet 19 corresponds to a fixed part 1925 of the leading-around part 1920 to the fixed body 20.

In this embodiment, when viewed in the "Z"-axis direction, in the first belt-shaped part 1860 and the leading-around part 1920, the first curved parts 1863 and 1923 are located at different positions in the "Y"-axis direction and the first curved part 1863 is located on the other side "−Y" in the "Y"-axis direction relative to the first curved part 1923. Further, when viewed in the "Z"-axis direction, in the second belt-shaped part 1870 and the leading-around part 1920, the first curved parts 1873 and 1923 are located at different positions in the "Y"-axis direction and the first curved part 1873 is located on the other side "−Y" in the "Y"-axis direction relative to the first curved part 1923. Further, in the first belt-shaped part 1860 and the second belt-shaped part 1870, the first curved parts 1863 and 1873 are located at the same position as each other in the "Y"-axis direction.

Therefore, in the first belt-shaped part 1860 and the second belt-shaped part 1870 whose width dimensions are equal to each other, their length dimensions from the leading-out parts 1861 and 1871 to the fixed parts 1865 and 1875 are the same as each other. Further, when the first belt-shaped part 1860 (the second belt-shaped part 1870) and the leading-around part 1920 whose width dimensions are different from each other are compared with each other, the length dimension of the first belt-shaped part 1860 (second belt-shaped part 1870) having a larger width dimension from the leading-out part 1861 (leading-out part 1871) to the fixed part 1865 (fixed part 1875) is longer than the length dimension of the leading-around part 1920 from the leading-out part 1921 to the fixed part 1925.

(Principal Effects in this Embodiment)

As described above, in the optical unit 100 in this embodiment, the gimbal mechanism 30 (support mechanism) is provided at a midway position in the "Z"-axis direction of the movable module 10, and the movable module 10 is swung with the midway position in the "Z"-axis direction of the movable module 10 as a swing center. Therefore, even when the movable module 10 is swung by the same angle, the maximum values of displacement amounts of the movable module 10 in the "X"-axis direction and the "Y"-axis direction are smaller on a front side in the optical axis direction than those of a structure that the movable module 10 is swung with the rear side in the optical axis direction as a swing center. Accordingly, a large space in a direction perpendicular to the optical axis "L" direction is not required to secure around the movable module 10 and thus the size of the optical unit 100 in the direction perpendicular to the optical axis "L" direction can be reduced.

In a case that the movable module 10 is swung with a midway position in the "Z"-axis direction of the movable module 10 as a swing center, a displacement amount of the movable module 10 is larger on the rear side in the optical axis direction than that of a structure that the movable module 10 is swung with the rear side in the optical axis direction as a swing center. Therefore, displacement amounts of the leading-around parts 1840 and 1920 of the flexible circuit boards 1800 and 1900 provided on the rear side in the optical axis direction of the movable module 10 also become larger. However, according to this embodiment, the flexible circuit boards 1800 and 1900 are provided with the first extended parts 1862, 1872 and 1922, which are extended from the leading-out parts 1861, 1871 and 1921 located on one side "+Y" in the "Y"-axis direction relative to the optical axis "L" to the other side "−Y" in the "Y"-axis direction relative to the optical axis "L", the first curved parts 1863, 1873 and 1923 curved from the tip end sides of the first extended parts 1862, 1872 and 1922 toward the rear side in the optical axis direction, and the second extended parts 1864, 1874 and 1924 extended from the first curved parts 1863, 1873 and 1923 toward one side "+Y" in the "Y"-axis direction. Further, in the second extended parts 1864, 1874 and 1924, the fixed parts 1865, 1875 and 1925 connected with the fixed body 20 are located on one side "+Y" in the "Y"-axis direction relative to the optical axis "L". Therefore, the dimensions of the flexible circuit boards 1800 and 1900 from the leading-out parts 1861, 1871 and 1921 to the fixed parts 1865, 1875 and 1925 are long and thus, when the movable module 10 is swung, forces applied to the movable module 10 from the flexible circuit boards 1800 and 1900 are small. Accordingly, the movable module 10 is swung appropriately and thus a shake such as a hand shake can be corrected appropriately.

Further, when viewed in the "Z"-axis direction, the leading-out parts 1861, 1871 and 1921 are overlapped with the fixed parts 1865, 1875 and 1925. Therefore, the dimensions of the flexible circuit boards 1800 and 1900 from the leading-out parts 1861, 1871 and 1921 to the fixed parts 1865, 1875 and 1925 are further long and thus, when the movable module 10 is swung, forces applied to the movable module 10 from the flexible circuit boards 1800 and 1900 can be further reduced.

Further, the flexible circuit boards 1800 and 1900 are provided with the second curved parts 1866, 1876 and 1926 between the leading-out parts 1861, 1871 and 1921 and the first extended parts 1862, 1872 and 1922. Further, the rear side end face 17 of the movable module 10 is fixed with the spacer 18 on one side "+Y" in the "Y"-axis direction relative to the optical axis "L" so as to be interposed between the rear side end face 17 and the first extended parts 1862, 1872 and 1922. Therefore, the first extended parts 1862, 1872 and 1922 of the flexible circuit boards 1800 and 1900 are extended in postures substantially parallel to the rear side end face 17 of the movable module 10. Accordingly, the first extended parts 1862, 1872 and 1922 of the flexible circuit boards 1800 and 1900 and the rear side end face 17 in the optical axis direction of the movable module are hard to interfere with each other and thus, when the movable module 10 is swung, forces applied to the movable module 10 from the flexible circuit boards 1800 and 1900 can be further reduced.

The gyroscope 13 is fixed to the rear side end face 17 of the movable module 10 and the gyroscope 13 is thinner than the spacer 18. Therefore, the flexible circuit boards 1800 and 1900 can be prevented from contacting with the gyroscope 13 and thus erroneous detection of a shake in the gyroscope 13 due to contact with the flexible circuit boards 1800 and 1900 can be prevented.

In the flexible circuit boards 1800 and 1900, the first belt-shaped part 1860, the second belt-shaped part 1870 and the leading-around part 1920 are extended and thus, in comparison with a case that one flexible circuit board is used, a force applied to the movable module 10 from the flexible circuit board can be further reduced. Further, the first belt-shaped part 1860, the second belt-shaped part 1870 and the leading-around part 1920 are shifted from each other in the "X"-axis direction and thus, when the movable module 10 is swung, impairing of followability of each of the first belt-shaped part 1860, the second belt-shaped part 1870 and the leading-around part 1920 due to contact of the flexible circuit boards can be suppressed.

In three flexible circuit boards (the first belt-shaped part 1860, the second belt-shaped part 1870 and the leading-around part 1920), the width dimensions of the first belt-shaped part 1860 and the second belt-shaped part 1870 located on both sides in the "X"-axis direction are equal to each other and their length dimensions from the leading-out parts 1861 and 1871 to the fixed parts 1865 and 1875 are equal to each other. Therefore, the forces applied to the movable module 10 from the first belt-shaped part 1860 and the second belt-shaped part 1870 can be balanced in the "X"-axis direction.

When the first belt-shaped part 1860 (second belt-shaped part 1870) and the leading-around part 1920 whose width dimensions are different from each other are compared, the length dimension of the first belt-shaped part 1860 (second belt-shaped part 1870) having a larger width dimension from the leading-out part 1861 (leading-out part 1871) to the fixed part 1865 (fixed part 1875) is longer than the length dimension of the leading-around part 1920 from the leading-out part 1921 to the fixed part 1925. Therefore, even when the first belt-shaped part 1860 (second belt-shaped part 1870) having a larger width dimension is used, the first belt-shaped part 1860 (second belt-shaped part 1870) easily follows a swing of the movable module 10 and is easily deformed.

In three flexible circuit boards (the first belt-shaped part 1860, the second belt-shaped part 1870 and the leading-around part 1920), the positions of the portions of the first curved parts 1863, 1873 and 1923 adjacent to each other in the "X"-axis direction are shifted from each other in the "Y"-axis direction. Therefore, when the movable module 10 is swung, impairing of followability of each of the first belt-shaped part 1860, the second belt-shaped part 1870 and the leading-around part 1920 due to contact of the flexible circuit boards can be suppressed.

The first bottom plate 1400 is formed with the opening part 1410 for extending the second extended parts 1864, 1874 and 1924 to the rear side in the optical axis direction. Therefore, the first belt-shaped part 1860, the second belt-shaped part 1870 and the leading-around part 1920 are easily fixed to the first bottom plate 1400. Further, the opening part 1410 is covered by the second bottom plate 1500 and thus entering of foreign matters can be prevented.

The gimbal mechanism 30 (support mechanism) is provided at a middle position in the "Z"-axis direction of the movable module 10 and thus, when the movable module 10 is swing, the maximum values of displacement amounts in the "X"-axis direction and the "Y"-axis direction can be reduced.

In the movable module 10, the weight 5 is provided on the front side end part 1c in the optical axis "L" direction of the optical module 1 and thus, in the optical axis "L" direction, the gravity center position of the movable module 10 is shifted to a support position side of the gimbal mechanism 30 (support mechanism) relative to the gravity center position of the optical module 1. Therefore, the gimbal mechanism 30 (support mechanism) is provided at the same position as the gravity center position of the movable module 10 in the "Z"-axis direction. Accordingly, the movable module 10 can be swung appropriately with a relatively small drive force and a mechanical resonance when the movable module 10 is swung can be suppressed and thus a shake of hand can be appropriately corrected by the movable module 10.

The weight 5 is provided on the front side end part 1c of the optical module 1 in the optical axis "L" direction. Therefore, even when the mass of the rear side end part in the optical axis "L" direction of the optical module 1 becomes larger due to the imaging element 1b and the frame 1110 provided in the rear side end part in the optical axis "L" direction of the optical module 1, the center of gravity can be set at the middle position in the "Z"-axis direction of the movable module 10. Accordingly, the support position of the gimbal mechanism 30 (support mechanism) which is set at the middle position in the "Z"-axis direction of the movable module 10 and the gravity center position of the movable module 10 can be set at the same position as each other in the "Z"-axis direction. In addition, the weight 5 is provided on the front side end part 1c in the optical axis "L" direction of the optical module 1, which is separated the most from the support position of the gimbal mechanism 30, and thus the gravity center position of the movable module 10 can be efficiently shifted.

The end face 51a of the weight 5 is formed in a flat face which is perpendicular to the optical axis "L" direction and thus the mass of the weight 5 is large in the portion which is separated the most from the support position of the gimbal mechanism 30. Therefore, the gravity center position can be effectively shifted in the optical axis "L" direction. Further, when an impact is applied from the outside and the movable module 10 is displaced to a front side in the optical axis "L" direction, the front side end part of the movable module 10 may be contacted with the fixed body 20. However, even in this case, the weight 5 located in the front side end part of the movable module 10 is abutted with the fixed body 20. Therefore, the lens 1a can be protected. Further, the end face 51a of the weight 5 is formed in a flat face which is perpendicular to the optical axis "L" direction and thus the weight 5 is contacted with the fixed body 20 in a large area. Therefore, an impact applied to the movable module 10 is relaxed.

The weight 5 is provided with the front plate part 51 and the tube part 52 surrounding an outer side face of the front side end part 1c of the movable module 10. Therefore, different from a case that the mass of the weight 5 is increased by increasing the dimension (thickness) in the optical axis "L" direction of the front plate part 51, even when a weight 5 having large mass is attached to the optical module 1, increase of the size in the optical axis "L" direction of the movable module 10 can be suppressed to a minimum. Further, in the weight 5, the front plate part 51 is formed in a circular plate shape and the tube part 52 is formed in a cylindrical tube shape. Therefore, mass distribution of the weight 5 is constant entirely in the circumferential direction with the optical axis "L" as a center. Accordingly, even in a case that the movable module 10 is swung in any direction with the optical axis "L" as a center, influence of the weight 5 is constant. Therefore, the shake correction drive mechanism 500 is easily controlled.

In the optical module 1, the front side end part 1c is structured of the portion 2a of the first holder 2 protruding from the second holder 3 to a front side in the optical axis "L" direction and the weight 5 is not contacted with the first holder 2. Therefore, even in a case that an attachment position of the first holder 2 with respect to the second holder 3 in the optical axis "L" direction is changed for focus adjustment of the lens 1a, the weight 5 can be provided in the same portion. Accordingly, the gravity center position of the movable module 10 can be appropriately shifted by the weight 5.

[Other Structural Examples of Weight 5]

In the embodiment described above, the weight 5 is provided on the front side end part 1c in the optical axis "L" direction of the optical module 1. However, according to a structure of the optical module 1, the weight 5 may be provided on a rear side end part in the optical axis "L" direction of the optical module 1. For example, it may be structured that the spacer 18 shown in FIGS. 7(A) and 7(B) and the like is formed in a rectangular frame shape as the weight 5 and is provided on the front side end part 1c in the optical axis "L" direction of the optical module 1. In this case, an end face on a rear side in the optical axis "L" direction of the weight 5 is formed in a flat face which is perpendicular to the optical axis "L" direction so that mass of a portion of the weight 5 which is separated the most from the support position of the gimbal mechanism 30 is increased. According to this structure, the mass of a portion of the weight 5 which is separated the most from the support position of the gimbal mechanism 30 is large. Therefore, the gravity center position can be effectively shifted in the optical axis "L" direction. Further, when an impact is applied from the outside, it may be occurred that the movable module 10 is displaced to a rear side in the optical axis "L" direction and a rear side end part of the movable module 10 is contacted with the fixed body 20. However, in this case, the weight 5 located in the rear side end part of the movable module 10 is abutted with the fixed body 20. Therefore, the gyroscope 13 can be protected. Further, the end face of the weight 5 is formed in a flat face perpendicular to the optical axis "L" direction and thus the weight 5 can be contacted with the fixed body 20 over a large area. Therefore, an impact applied to the movable module 10 can be relaxed.

[Other Structural Examples of Optical Unit 100]

In the embodiment described above, the present invention is, as an example, applied to the optical unit 100 which is used in a cell phone with a camera. However, at least an embodiment of the present invention may be applied to the optical unit 100 which is used in a thin digital camera or the like.

The optical unit 100 with a shake correction function to which at least an embodiment of the present invention is applied may be structured as an action camera or a wearable camera mounted on a helmet, a bicycle, a radio-controlled helicopter or the like. The camera is used for photographing under a situation that a large shake may be occurred but, according to at least an embodiment of the present invention, the shake can be corrected and thus a high quality image can be obtained.

Further, the optical unit 100 with a shake correction function to which at least an embodiment of the present invention is applied may be fixed and mounted in an apparatus such as a refrigerator in which vibration is occurred in a certain interval so as to be capable of being remote controlled. In the apparatus, a service can be provided in which information in the inside of the refrigerator is obtained at a visit place, for example, at the time of shopping. According to this service, the camera system is provided with a posture stabilizing device and thus a stable image can be transmitted even when vibration may occur in the refrigerator. Further, this device may be fixed to a device such as a bag, a satchel or a cap of a child and a student which is carried at a time of commuting or attending school. In this case, states of surroundings are photographed at a constant interval and, when the image is transmitted to a predetermined server, the parent or the like watches the image at a remote place to secure security of the child. In this application, without conscious of a camera, a clear image is photographed even when vibration occurs at the time of moving. Further, when a GPS is mounted in addition to the camera module, the position of a target person can be obtained simultaneously and thus, when an accident occurs, its position and situation can be confirmed immediately.

In addition, when the optical unit 100 with a shake correction function to which at least an embodiment of the present invention is applied is mounted at a position capable of photographing toward a front side in a car, it can be used as an on-vehicle monitoring device such as a drive recorder. Further, it may be structured that the optical unit 100 with a shake correction function to which at least an embodiment of the present invention is applied is mounted at a position capable of photographing toward a front side in a car and a front side image is photographed automatically at a constant interval and is automatically transmitted to a predetermined server. Further, when this image is distributed while interlocking with traffic jam information in the Vehicle Information and Communication System or the like, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correction function to which at least an embodiment of the present invention is applied may be applied to shake correction of an optical device from which a light beam is emitted such as a laser beam pointer, a portable or on-vehicle projection display device and direct viewing type display device. Further, in an observation system with a high magnification such as an astronomical telescope system or a binocular system, the optical unit 100 may be used to observe without using an auxiliary locking device such as three-legged supports. In addition, when at least an embodiment of the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An optical unit with a shake correction function comprising:
    a movable module which holds an optical element;
    a fixed body comprising a body part which surrounds the movable module;
    a support mechanism which swingably supports the movable module at a midway position in an optical axis direction of the movable module; and
    a shake correction drive mechanism structured to swing the movable module;
    wherein the movable module comprises:
        an optical module which holds the optical element; and
        a weight provided on one side of a front side and a rear side in the optical axis direction of the optical module the weight being configured to shift a gravity center position of the movable module to a support position side of the support mechanism relative to a gravity center position of the optical module in the optical axis direction; and
    wherein an end face of one side of the weight is formed in a flat face which is perpendicular to the optical axis direction;
    wherein the one side is the front side in the optical axis direction;
wherein
    the optical module comprises a holder which holds a lens as the optical element and a frame which holds the holder,
    the frame comprises:
        a holder holding part in a tube shape which holds the holder on an inner side;

a flange part which is enlarged from an end part on the rear side in the optical axis direction of the holder holding part; and a coil holding part provided in a portion protruded from an outer side edge of the flange part toward the front side in the optical axis direction and holds a coil structuring the shake correction drive mechanism;

the support mechanism is a gimbal mechanism structured on the front side in the optical axis direction relative to the flange part, and the weight is provided with an opening part at a position where an optical axis of the lens is passed and is fixed to a front end in the optical axis direction of the holder.

2. The optical unit with a shake correction function according to claim 1, wherein the weight comprises:

a front plate part provided with an opening part at a position where an optical axis of the optical element is passed and is overlapped with a front side end part in the optical axis direction of the optical module from a front side in the optical axis direction; and a tube part which is bent to a rear side in the optical axis direction from an outer side edge of the front plate part and surrounds an outer side face of the front side end part.

3. The optical unit with a shake correction function according to claim 2, wherein the optical module comprises a first holder which holds the optical element and a second holder which holds the first holder, the front side end part comprises a portion of the first holder which is protruded to the front side in the optical axis direction with respect to the second holder, and a rear side end part in the optical axis direction of the tube part of the weight is fixed to the second holder through gap spaces between the front side end part and the front plate part and between the front side end part and the tube part.

4. The optical unit with a shake correction function according to claim 3, wherein at least a front side edge of the opening part of the weight is provided with an antireflection property.

5. The optical unit with a shake correction function according to claim 4, wherein the support mechanism is a gimbal mechanism.

6. The optical unit with a shake correction function according to claim 2, wherein the front plate part is formed in a circular plate shape and the tube part is formed in a cylindrical tube shape.

7. The optical unit with a shake correction function according to claim 6, wherein at least a front side edge of the opening part of the weight is provided with an antireflection property.

8. The optical unit with a shake correction function according to claim 1, wherein the one side is a rear side in the optical axis direction.

9. The optical unit with a shake correction function according to claim 1, wherein the support mechanism is a gimbal mechanism.

10. The optical unit with a shake correction function according to claim 1, wherein at least a front side edge of the opening part of the weight is provided with an antireflection property.

11. The optical unit with a shake correction function according to claim 1, wherein the gimbal mechanism comprises a movable frame which is attached between the fixed body and the holder holding part of the frame and swingably supports the frame, and the movable frame is provided at a position overlapping with the shake correction drive mechanism.

12. The optical unit with a shake correction function according to claim 11, wherein a movable frame arrangement space in which the movable frame is disposed is provided on an outer side in a radial direction with respect to the holder holding part, and a coil holding part which holds the coil is provided on an outer side with respect to the movable frame arrangement space.

13. The optical unit with a shake correction function according to claim 1, wherein the holder of the optical module comprises a first holder which holds the optical element and a second holder which holds the first holder, the weight is provided with a tube part which surrounds an outer side face of a front side end part that is a portion of the first holder protruding to the front side in the optical axis direction with respect to the second holder, and a rear side end part in the optical axis direction of the tube part is fixed to the second holder so as to have a gap space between the front side end part and the tube part.

14. The optical unit with a shake correction function according to claim 13, wherein the weight comprises:

a front plate part which is overlapped with the front side end part of the first holder from the front side in the optical axis direction; and the tube part which is bent to a rear side in the optical axis direction from an outer side edge of the front plate part and surrounds an outer side face of the front side end part, the weight is fixed to the second holder through gap spaces between the front side end part and the front plate part and between the front side end part and the tube part.

15. The optical unit with a shake correction function according to claim 1, wherein an end part on the rear side in the optical axis direction of the holder is provided with a photographing circuit module having an imaging element, the photographing circuit module is provided with a flexible mounting circuit board, and the flexible mounting circuit board is connected with a signal outputting flexible circuit board for outputting a signal obtained by the imaging element.

* * * * *